(12) United States Patent
Filo et al.

(10) Patent No.: US 8,908,015 B2
(45) Date of Patent: Dec. 9, 2014

(54) APPARATUS AND METHOD FOR PRODUCING IMAGES FOR STEREOSCOPIC VIEWING

(75) Inventors: Andrew S. Filo, Cupertino, CA (US); David G. Capper, Novato, CA (US)

(73) Assignee: Appcessories LLC, Novato, CA (US)

(*) Notice: Subject to any disclaimer, the term of this patent is extended or adjusted under 35 U.S.C. 154(b) by 771 days.

(21) Appl. No.: 13/017,157

(22) Filed: Jan. 31, 2011

(65) Prior Publication Data

US 2012/0026298 A1 Feb. 2, 2012

Related U.S. Application Data

(60) Provisional application No. 61/386,346, filed on Sep. 24, 2010, provisional application No. 61/317,035, filed on Mar. 24, 2010.

(51) Int. Cl.
*H04N 13/04* (2006.01)
*G03B 35/10* (2006.01)
*G03B 35/18* (2006.01)

(52) U.S. Cl.
CPC ............... *G03B 35/10* (2013.01); *G03B 35/18* (2013.01)
USPC .......................................................... 348/49

(58) Field of Classification Search
None
See application file for complete search history.

(56) References Cited

U.S. PATENT DOCUMENTS

| 6,417,969 | B1 | 7/2002 | DeLuca et al. |
| 7,012,745 | B2 | 3/2006 | Ishikawa |
| 7,079,174 | B2 | 7/2006 | Taniguchi et al. |
| 7,268,747 | B2 | 9/2007 | Taniguchi et al. |
| 7,616,187 | B2 | 11/2009 | Koo et al. |
| 2001/0015753 | A1 | 8/2001 | Myers |
| 2003/0072570 | A1* | 4/2003 | Seo ................................ 396/331 |
| 2004/0095462 | A1 | 5/2004 | Miyata et al. |
| 2004/0239763 | A1 | 12/2004 | Notea et al. |
| 2006/0055773 | A1 | 3/2006 | Kutka |

(Continued)

FOREIGN PATENT DOCUMENTS

GB 2436409 A * 9/2007

OTHER PUBLICATIONS

PCT/US2011/29135—International Search Report. dated May 23, 2009.

(Continued)

*Primary Examiner* — Tung Vo
*Assistant Examiner* — Joseph Becker
(74) *Attorney, Agent, or Firm* — Perry Hoffman & Associates P.C.

(57) ABSTRACT

Disclosed are methods and apparatus for producing images for stereoscopic, three-dimensional viewing generated with existing mobile graphical devices, such as cameras, video recorders, PDAs, telephones, and other devices, such as the iPhone™. Two reflectors, which may be mirrors or prisms, are positioned to separate the field of view of a camera lens on the mobile graphical device into a direct field of view and an offset field of view and to record and display the separated fields in a two-paned format on the mobile graphical device. Eye lenses are used to separately view the split images. An integrated housing and cradle receive the mobile graphical device and are coupled to the reflectors and the eye lenses. An area of each pane may be provided to display control icons for three-dimensional viewing, and a control area may be provided out of view on a touch screen for user control.

18 Claims, 30 Drawing Sheets

(56) References Cited

U.S. PATENT DOCUMENTS

| | | |
|---|---|---|
| 2006/0125917 A1 | 6/2006 | Cha et al. |
| 2006/0274218 A1* | 12/2006 | Xue .............................. 349/16 |
| 2007/0003134 A1 | 1/2007 | Song et al. |
| 2007/0097319 A1 | 5/2007 | McKay et al. |
| 2007/0103547 A1 | 5/2007 | Kim et al. |
| 2007/0222856 A1 | 9/2007 | Amaru |
| 2007/0252953 A1 | 11/2007 | Metzger et al. |
| 2008/0079804 A1 | 4/2008 | Hamagishi et al. |
| 2008/0080049 A1 | 4/2008 | Hamagishi et al. |
| 2008/0211941 A1 | 9/2008 | Deever et al. |
| 2008/0266387 A1 | 10/2008 | Krijn et al. |
| 2009/0278916 A1 | 11/2009 | Ito |
| 2010/0225744 A1* | 9/2010 | Tomizawa et al. .............. 348/47 |
| 2011/0115751 A1* | 5/2011 | Wernersson .................. 345/179 |

OTHER PUBLICATIONS

PCT/US2011/29135—Written Opinion of the International Searching Authority. dated May 23, 2009.

PCT/US2011/29135—Notification of Transmittal of the International Search Report and the Written Opinion of the International Searching Authority or the Declaration. May 23, 2009.

* cited by examiner

FIG. 1C
FIG. 1D
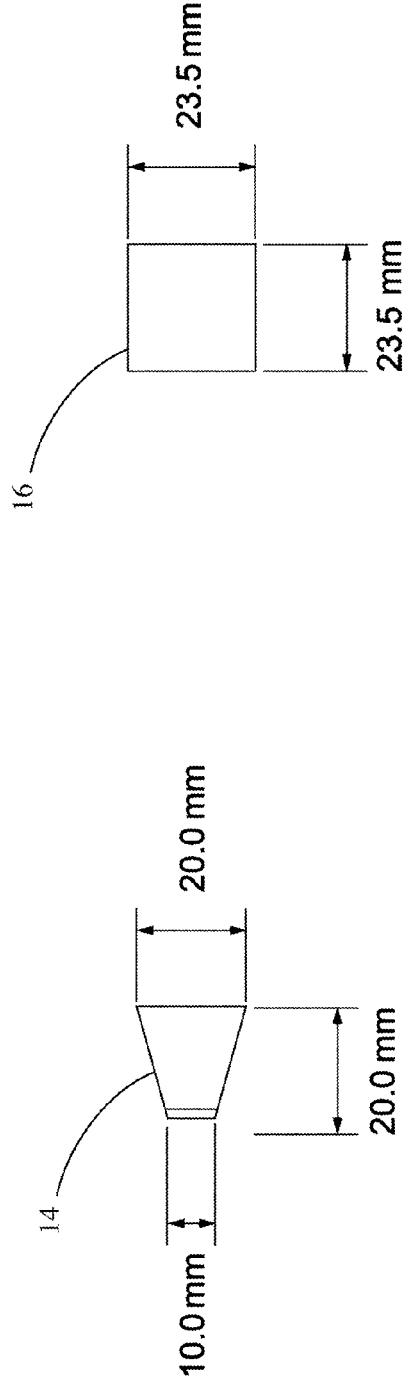
FIG. 1E
FIG. 1F

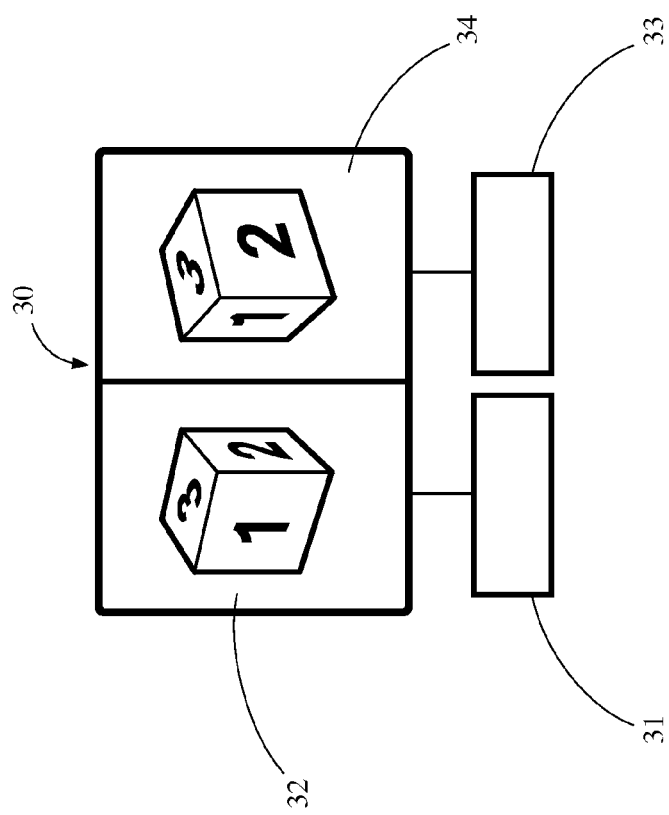

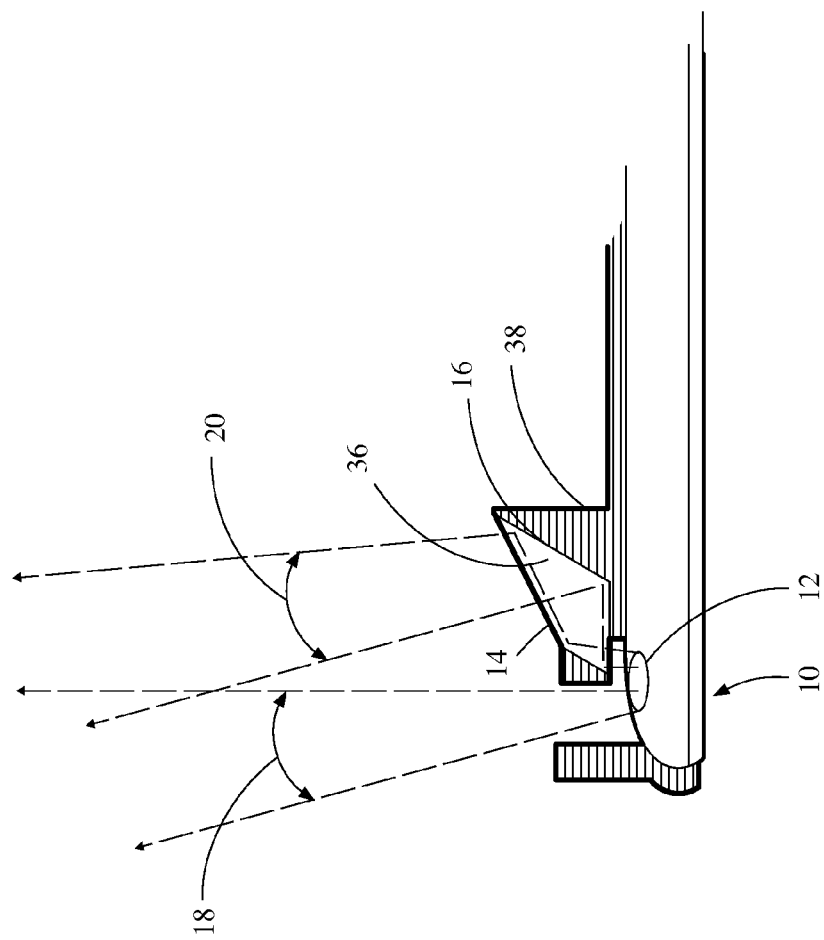

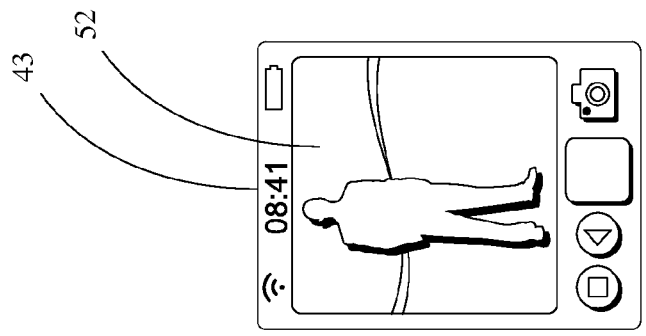
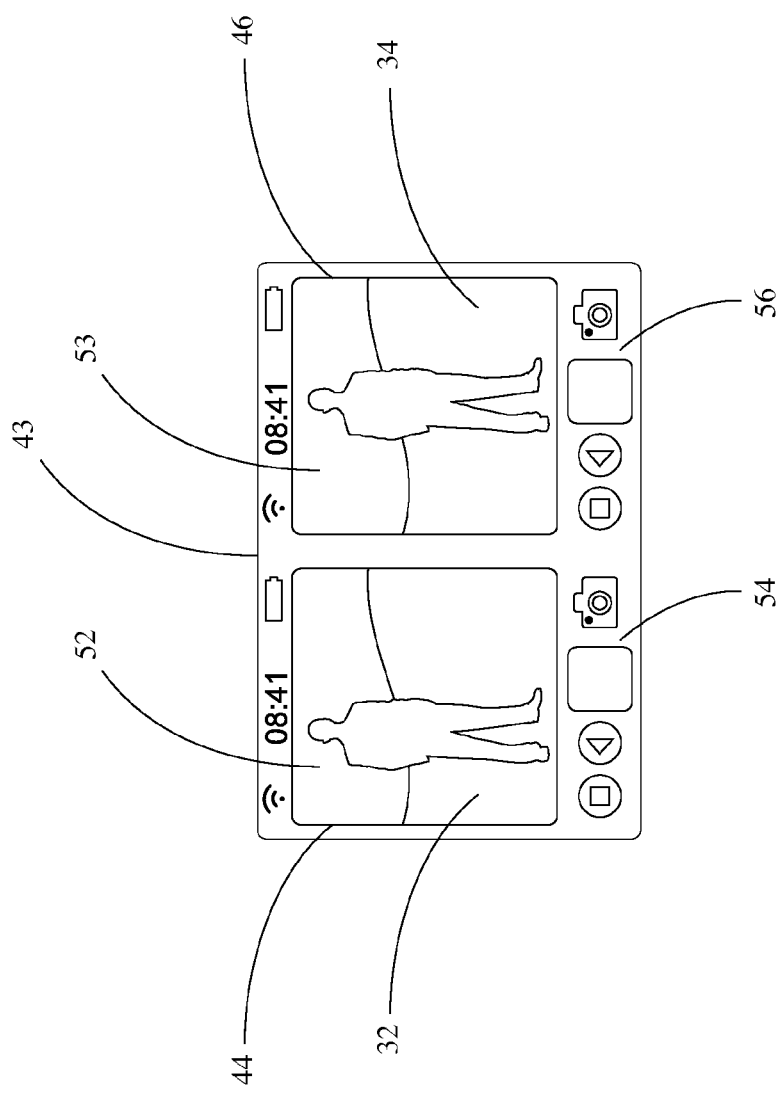
FIG. 6B
FIG. 6A

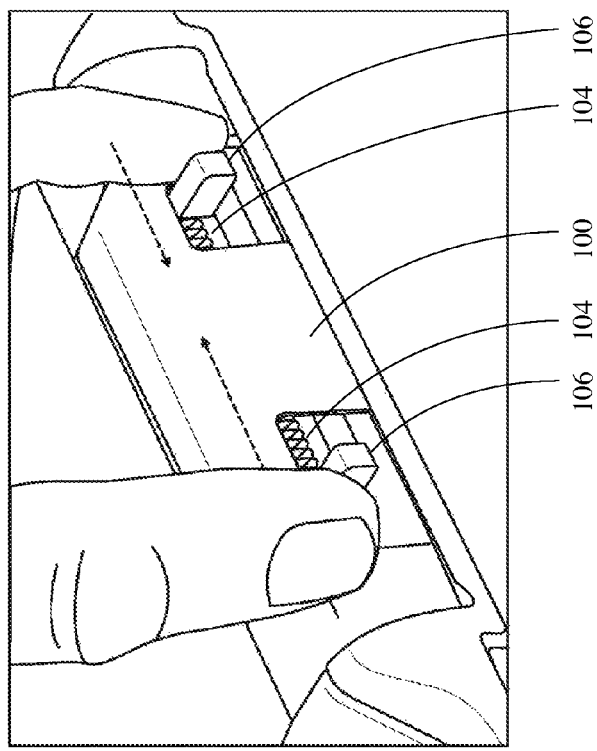
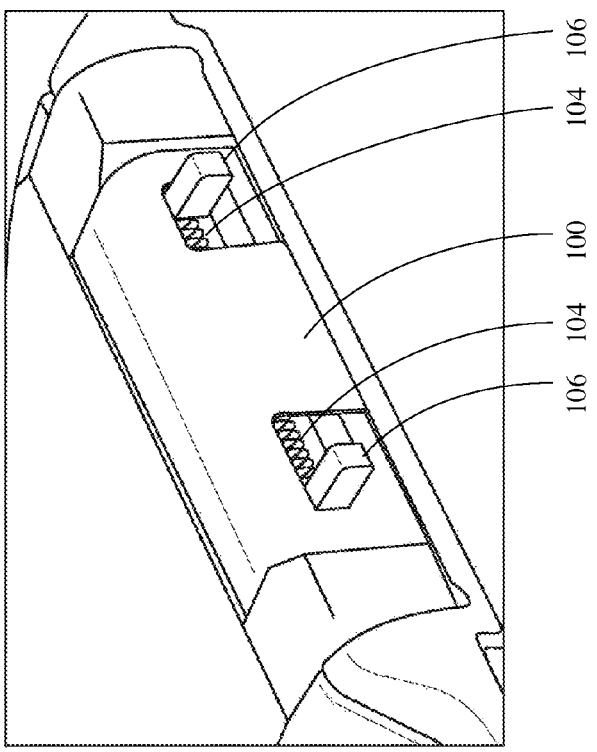
FIG. 22B
FIG. 22A

APPARATUS AND METHOD FOR PRODUCING IMAGES FOR STEREOSCOPIC VIEWING

CROSS-REFERENCE TO RELATED APPLICATION

This application claims priority pursuant to 35 U.S.C. 119(e) to U.S. Provisional Application No. 61/386,346, filed on Sep. 24, 2010 and U.S. Provisional Application No. 61/317,035, filed on Mar. 24, 2010, both which are incorporated herein by reference in their entirety.

FIELD OF THE INVENTION

The present invention relates generally to producing images for stereoscopic viewing, and more particularly to an apparatus and methods for separating the fields of view of a camera lens into a direct field of view and an offset field of view and for producing images from each field of view side by side on a mobile graphical device, and further for viewing the produced images with an integrated stereoscopic viewer as a single three-dimensional image.

BACKGROUND OF THE INVENTION

Since the invention of the stereoscope by Sir Charles Wheatstone in 1838, people have been entertained by viewing two-dimensional media as three-dimensional. One strategy used to accomplish stereoscopy, known as stereopsis, involves creating two views of a single image, one view offset from the other, and providing each view separately to an observer's eyes. Systems or devices that use stereopsis to create photography or video for three-dimensional viewing involve image-splitting using mirrors or other reflectors and camera lenses to produce offset images that may be viewed through eye lenses that separate the images to each eye. Different configurations of mirrors and lenses have been used to split images with varying results.

Systems using one reflector, such as a mirror, one lens, and one two-dimensional camera involve placing a mirror nearly perpendicular, but slightly inward to, the field of view of a camera so that the camera captures mirrored images, one slightly offset from the other. In order to view the split images stereoscopically, one of the images must be reversed, which requires some form of post-processing. Prior art systems using two mirrors, one lens and one camera have involved using two mirrors hinged together at their edges and slightly angled with respect to each other and aiming the camera at the hinged edges. Similar systems have also involved unhinging the mirrors and separating them slightly. These types of two-mirror systems were used starting in the late nineteenth century, but are seldom used today. They are awkward to use because the camera is aimed at right angles to the subject and the images are reversed left to right. Other systems, using three or four reflectors, such as mirrors or prisms, have been used, but are more complicated to manufacture and maintain. A discussion of these systems may be found at http://www.l-hup.edu/~dsimanek/3d/3dgallery16.htm.

Several devices in the prior art are known to provide or use an integrated viewer with left and right eye lenses, or viewing lenses, to stereoscopically view images provided on film or transmitted from an outside source, such as the internet or some other network. U.S. Pat. No. 2,313,562, issued to P. Mainardi, et al., for "Stereoscope" discloses "a stereoscope in which the viewing lenses have approximately the same focal length as the lens or lenses with which the pictures were taken", which uses a housing with a front window on one side and two oculars on the other side, a means for symmetrically holding a film with a split image, and reflectors for rotating the images for proper viewing. This device requires that split images are provided oppositiaxially, for example, head-to-head or foot-to-foot. United States Patent Application number US 2006/0055773, by Kutka, for "Device and Method for Stereoscopic Reproduction of Picture Information on a Screen" discloses a housing permanently attached to a screen, viewing lenses mounted to the housing separated by a distance approximating the distance between an observer's eyes, and optical means for allowing an observer to separately view left and right images for three-dimensional viewing. This device does not have a camera and does not generate the split image. The images must originate from a network or other outside source. United States Patent Application number US 2007/0222856, by Amaru, for "Portable Device for Viewing an Image and Associated Production Method" discloses a housing with a display and two viewer openings, an optical unit with a lens or reflector arrangement that magnifies or sharpens images, a memory for storing externally transmitted images, the possibility of viewing received images three-dimensionally, and a location detection means to facilitate receiving images relevant to a viewer's surroundings. This device does not produce and must receive images. United States Patent Application number US 2010/0277575, by Ismael, et al., for "Method and Apparatus for Providing a 3D Image via a Media Device" discloses a frame for holding a handheld media display device that is displaying a right input image and a left input image and an arrangement of prisms and lenses that present a three-dimensional image to a viewer. This device does not create images and requires that a split image is provided for three-dimensional viewing.

Another series of devices or systems in the prior art involve using reflectors for creating and manipulating filtered images, multiple fields of view, or split, offset images. U.S. Pat. No. 4,009,951, issued to Ihms, for "Apparatus for Stereoscopic Photography" discloses a setup using a conventional device, such as a 35 mm SLR camera, whereby reflectors and filters are attached to the camera lens to capture images that may later be viewed as three-dimensional. This device does not capture or create offset images as described earlier. U.S. Pat. No. 4,288,819, issued to Williams, for "Multi-Field Imaging Device" discloses a "multi-field imaging device . . . for directing light from a first optical field and a separated second optical field into a video camera used for security surveillance thereby reproducing a split-screen image with the video camera. The multi-field imaging device can be aligned whereby light from the second optical field is directed directly onto one side of an image plane. A pair of mirrors are adjusted so that light from the first optical field is reflected by the mirrors to the image plane in a juxtaposed relation with the light from the second optical field." This device provides for multiple fields of view on a single screen, but is otherwise not relevant to stereoscopic viewing of images. U.S. Pat. No. 5,856,888, issued to Ross, et al., for "Split Beam Optical Character Reader" discloses an "optical system for an optical character reader in which a camera, such as a TV camera, reads an image field in a document, includes at least one pair of mirrors which shift half of the image both laterally and vertically to convert a relatively long image . . . into a rectangular image with a much lower aspect ratio." This optical system reshapes the image field to allow for simplified and lower cost optical character recognition. While this device splits images, it does not do so for three-dimensional viewing. U.S. Pat. No. 6,603,876, issued to Matsuo, et al., for "Stereoscopic Picture Obtaining Device" discloses a device that obtains two pictures from different locations of viewpoint, rotates the pictures using dove prisms, combines the pictures, and condenses the pictures for stereoscopic viewing while preserving the aspect ratio of the original pictures. This device is relatively complicated and relatively expensive to produce and is not portable.

While the prior art reveals devices and systems for splitting and manipulating images for stereoscopic viewing, as well as portable devices for viewing three-dimensional images, a portable, handheld device or system for producing split, offset images or video for immediate stereoscopic viewing and enjoyment is unknown in the prior art. Accordingly, it would be desirable to develop and provide a self-contained device that uses a camera, a simplified reflector arrangement, and viewing lenses to produce and enjoy three-dimensional visual media. The inventions discussed in connection with the described embodiments address these and other deficiencies of the prior art.

The features and advantages of the present inventions will be explained in or apparent from the following description of the preferred embodiment considered together with the accompanying drawings.

SUMMARY OF THE INVENTION

The present inventions address the deficiencies of the prior art of three-dimensional visual media. Specifically, improvements are in the area of stereoscopic viewing of offset images on mobile graphical devices, such as iPhones™ or other similar devices.

The field of view of a camera on a mobile graphical device is split into two portions with one portion revealing a direct field of view and the other portion having a field of view revealing reflections off of two reflectors, such as mirrors or prisms, that are positioned to reflect an offset view of the direct field of view from the first portion of the field of view. This arrangement may be coupled to a cradle or housing that receives the mobile graphical device and is coupled to the reflectors and to a pair of eye lenses for viewing split images as three-dimensional visual media. Thus, unlike the prior art, a user of a mobile graphical device, such as an iPhone™, will be able to use a two-dimensional camera on a handheld device to create and view three-dimensional photographs and videos in real time using a portable container. Embodiments of this device are unknown in the prior art.

If the mobile graphical device has a touch screen on the display, each split image may be augmented with an area for displaying control icons, and the screen may further have an area for controlling the icons, which will appear to a viewer as three-dimensional. For example, a viewer may see an icon as a three-dimensional camera and may take a picture by touching the area next to the icon. This interface is designed so that the three-dimensional image will not be interfered with by a user's finger. Embodiments of this type of three-dimensional interface are also unknown in the prior art.

Described embodiments of the inventions provide an apparatus for producing images for stereoscopic viewing of visual media on a mobile graphical device. The mobile graphical device has a camera lens with a field of view split into two portions, a first portion and a second portion. The first portion of the field of view is unblocked and the second portion of the field of view faces a first reflector, which may be a mirror or a prism. The first reflector is juxtaposed relative to the camera and positioned at an angle to the plane crossing the circumference of the camera lens. A second reflector, which may also be a mirror or a prism, is juxtaposed relative to the first reflector and positioned so that it reflects an offset view of the unblocked first portion of the field of view to the first reflector and into the second portion of the field of view. A sensor, which is part of the camera in the described embodiments, is positioned to receive light reflected into each field of view. The sensor also outputs data defining the images produced by the received reflections. A first memory is used to store data defining the image, or reflection, received through the first portion of the field of view, and a second memory is used to store data defining the image, or reflection, received through the second portion of the field of view.

In certain embodiments, the mobile graphical device has a display with a two-paned image. The first pane shows an image defined by the data in the first memory as a direct view of the first portion of the field of view. The second pane, which is adjacent to the first pane, shows an image defined by the data in the second memory as an offset view of the first portion of the field of view as reflected through the second portion of the field of view. Also in certain embodiments, a first eye lens is positioned for viewing only the first pane and a second eye lens is positioned for viewing only the second pane. A viewer who views the images in the first pane and the second pane through the first eye lens and the second eye lens will see a single, three-dimensional image.

In further embodiments, where the display of the mobile graphical device is a touch screen, areas may be placed on the display bordering the first pane and the second pane for producing stereoscopic, three-dimensional icons for user control. A first control icon area borders the first pane and a second control icon area borders the second pane. The control icon areas are placed on corresponding sides of the first pane and the second pane so that when viewed by an end user through the first eye lens and the second eye lens, the user will see a single three dimensional image and a single three dimensional icon in an area bordering the image. A described embodiment has a user control area adjacent to the three-dimensional icons and outside the area viewable through the eye lenses that provide user control functions when touched by an end user. For example, the end user may see a three-dimensional icon of a camera and be able to touch an area in the user control area near the icon to take a picture.

Certain embodiments may have a cradle configured to receive the mobile graphical device, the sensor, the first memory and the second memory where the cradle is coupled to the first reflector, the second reflector, the first eye lens and the second eye lens. A housing may further be coupled to the cradle, the first reflector, the second reflector, the first eye lens and the second eye lens. Various embodiments allow for different arrangements of the cradle and/or the housing, such as arrangements where the area between the mobile graphical device and the eye lenses is open and arrangements where the area between the mobile graphical device and the eye lenses is enclosed.

Also in described embodiments, the camera lens, the first reflector, the second reflector, the first eye lens and the second eye lens are positioned so that the first portion of the field of view and the second portion of the field of view simulate the view of a two-eyed human observer.

Certain embodiments are designed for receiving a mobile graphical device into a cradle where the cradle has a surface with an aperture exposing a field of view as described above. Similarly, the first reflector and the second reflector are positioned as described above, except they are positioned relative to the aperture, and a first eye lens and a second eye lens are coupled to the cradle. Also, a fastener allows one to secure a mobile graphical device to the cradle. Embodiments are described wherein the cradle is configured to receive a mobile graphical device so the a camera lens in the mobile graphical device is positioned within the aperture of the cradle.

BRIEF DESCRIPTION OF THE DRAWINGS

The inventions will now be more particularly described by way of example with reference to the accompanying drawings. Novel features believed characteristic of the inventions are set forth in the claims. The inventions themselves, as well as the preferred mode of use, further objectives, and advantages thereof, are best understood by reference to the following detailed description of the embodiment in conjunction with the accompanying drawings, in which:

FIG. 1C shows a side plan view of a first reflector.

FIG. 1D shows a top plan view of a first reflector.

FIG. 1E shows a side plan view of a second reflector.

FIG. 1F shows a top plan view of a second reflector.

FIG. 2B shows the stereo camera image produced by the setup of FIG. 2A and the respective memory used to store data for each image.

FIG. 3A shows a side view of the optical paths of the split fields of view with a prism used for the first reflector and the second reflector.

FIG. 6A shows a double image and a user control GUI for using a camera as it appears in a two-dimensional, double-paned display of the mobile graphical device.

FIG. 6B shows a single image and a user control GUI for using a camera as it appears in a three-dimensional, single pane on the display of the mobile graphical device.

FIG. 22A shows a perspective view of the spring controlled mechanism of the spring latch used to attach the cradle to the housing.

FIG. 22B shows a perspective view of how a user moves the spring controlled mechanism of the spring latch.

DETAILED DESCRIPTION OF THE EMBODIMENTS

Figure 1A:
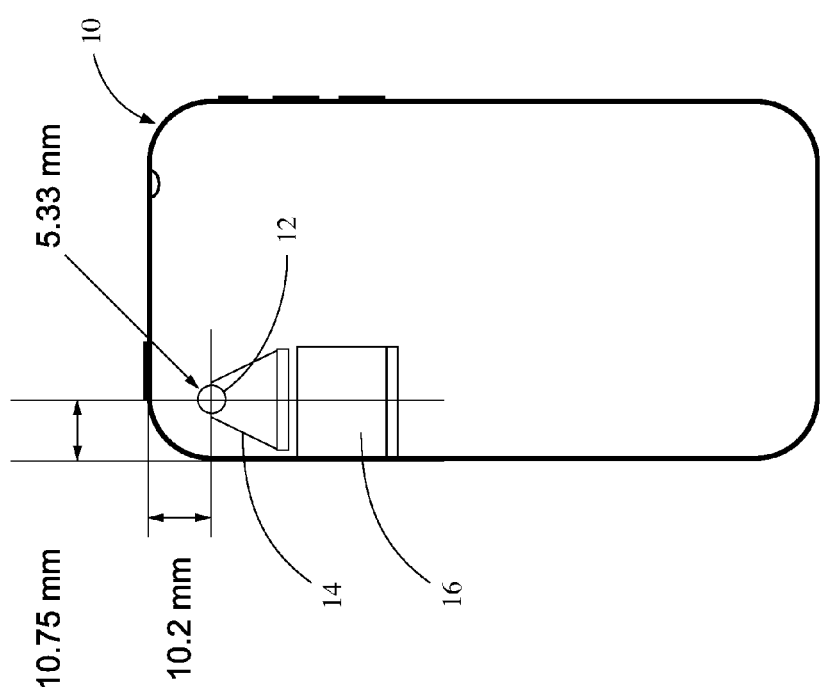
FIG. 1A shows a top plan view of the camera lens side of a mobile graphical device with a two reflector image splitting arrangement.

The described embodiments reveal an apparatus and methods for producing images for stereoscopic viewing on mobile graphical devices, such as an iPhone™ or other similar telephones or communications devices, PDAs, cameras, video recorders, an iTouch™, an iPod, or other related devices. One embodiment of an apparatus for producing stereoscopic images comprises a mobile graphical device with a camera lens. The camera lens has a field of view wherein the field of view is limited to a first portion of the field of view and a second portion of the field of view. A first reflector, which may be a mirror or a prism, is juxtaposed relative to the camera so that the first reflector is outside of the first portion of the field of view, leaving the first portion of the field of view unobstructed by any reflectors and focused on what an end user wishes to see in three-dimensions. The second portion of the field of view comprises the first reflector, with the first reflector at an angle to the plane crossing the circumference of the camera lens. A second reflector is juxtaposed relative to the first reflector so that the second reflector reflects what is in the first portion of the field of view from an offset position. Everything that is reflected off of the second reflector is reflected off of the first reflector and into the camera lens. Thus, the camera lens receives a direct view of what is in the first portion of the field of view and an offset view of what is in the first portion of the field of view as reflected off of the two reflectors in the second portion of the field of view. A sensor receives the light reflected through both portions of the field of view and outputs data defining the received reflections. A first memory and a second memory are used for storing the data defining the reflections received through the first portion of the field of view and the second portion of the field of view respectively. The mobile graphical device in the described embodiments comprises a display with a two-paned image. The first pane shows an image defined by the data in the first memory as a direct view of the first portion of the field of view. The second pane is adjacent to the first pane and shows an image defined by the data in the second memory as an offset view of the first portion of the field of view as reflected through the second portion of the field of view. A first eye lens and a second eye lens, which may be in the form of glasses or a binocular-like arrangement, may be added to the apparatus and positioned so that only the first pane may be viewed through the first lens and only the second pane may be viewed through the second lens.

The apparatus may further comprise a user interface where the display is a touch screen that has a first control icon area bordering the first pane and a second control icon area bordering corresponding sides of the second pane so that, when viewed by an end user through the first eye lens and the second eye lens, the first pane and the second pane appear as a single three-dimensional image and the first control icon area and the second control icon area appear as a single set of three-dimensional icons. Additionally, a user control area adjacent to the three-dimensional icons and outside the area viewable through the first eye lens and the second eye lens may be used to provide user control functions when touched by an end user. Embodiments using the interface described in this paragraph may or may not include a camera and may or may not include a first reflector and a second reflector.

Other embodiments are defined without the mobile graphical device wherein an apparatus for creating and viewing a split field of view for stereoscopic viewing comprises the first reflector, the second reflector, the first eye lens and the second eye lens, as already described. These embodiments further have a cradle with a fastener for securing a mobile graphical device and a surface including an aperture exposing a field of view. The field of view is limited to a first portion of the field of view and a second portion of the field of view and the cradle is configured to receive a mobile graphical device so that a camera lens in the mobile graphical device is positioned within the aperture of the cradle. The display on the mobile graphical device displays a two-paned image towards the first eye lens and the second eye lens with one pane being a direct view through the first portion of the field of view as seen through the first eye lens and the other pane being an offset view of the first portion of the field of view through the second portion of the field of view as seen through the second eye lens.

The embodiments described thus far may be coupled together in various ways with the cradle configured to receive the mobile graphical device, the sensor, the first memory and the second memory wherein the cradle is coupled to the first reflector, the second reflector, the first eye lens and the second eye lens. Additionally, the embodiments described thus far may be configured together in various ways with the apparatus further comprising a housing coupled to the cradle, the first reflector, the second reflector, the first eye lens and the second eye lens. The use of the cradle and the housing should not be construed to limit the possible configurations of the cradle and the housing, including configurations where the cradle is part of the housing, where there is no housing, or where various openings in the housing allow access to the touch screen for user control.

All embodiments described herein, where a two-paned display is used and the first eye lens and the second eye lens are used, are configured to simulate the view of a two-eyed human observer, whether or not a camera is used, whether or not reflectors are used, and whether or not a three-dimensional user interface is used.

Figure 1B:
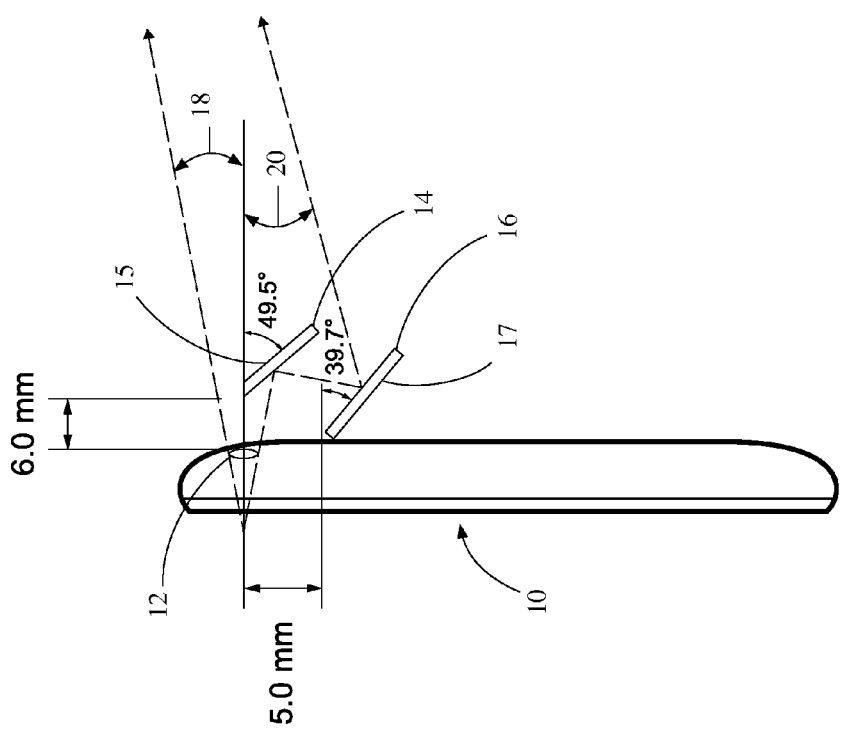
FIG. 1B shows a side plan view of the camera lens side of a mobile graphical device with a two reflector image splitting arrangement.

FIG. 1A shows a top plan view of the camera lens 12 side of a mobile graphical device 10 with a two reflector image splitting arrangement. The mobile graphical device 10 may be an iPhone™ and may have a camera lens 12 having a diameter of 5.33 mm placed 10.75 mm from the left side of the mobile graphical device 10 and 10.2 mm from the top of the mobile graphical device 10. The first reflector 14 is shown as a trapezoidal-shaped mirror blocking half of the camera lens 12 and dividing the field of view of the camera lens 12. The second reflector 16 is shown as a square mirror set away from the first reflector 14. FIG. 1B shows a side plan view of the camera lens 12 side of a mobile graphical device 10 with a two reflector image splitting arrangement. The camera lens 12 is shown in relation to the first reflector 14 and the second reflector 16. The first reflector 14 is placed 6.0 mm in front of the camera lens 12 and positioned so that it evenly splits the field of view from the camera lens 12 into a first portion of the field of view 18 and, with the second reflector 16, into a second portion of the field of view 20. The second reflector 16 is attached to the mobile graphical device 10 5.0 mm from the horizontal line crossing the center of the camera lens 12. The back side of the first reflector 14 is set 49.5° from the horizontal plane bisecting the camera lens 12, and the front side of the second reflector 16 is set 39.7° from the horizontal plane 5.0 mm below the horizontal plane bisecting the camera lens 12. This placement of the reflectors ensures that the first portion of the field of view 18 and the second portion of the field of view 20 are convergent and not parallel. FIG. 1B also shows an embodiment with the silvered side of the first reflector 15 and the silvered side of the second reflector 17 on the back of the respective reflectors. In embodiments where the material protecting the silvered side of the reflector may cause unacceptable refraction, unacceptable degradation in light intensity or any other unacceptable characteristic caused by the material, the silvered side of the first reflector 15 and the silvered side of the second reflector 17 may be placed on the front of the first reflector 14 and the second reflector 16 respectively to create first surface mirrors. The dashed lines in FIG. 1B show the general direction of the first portion of the field of view 18 and the second portion of the field of view 20.

FIG. 1C shows a side plan view of a first reflector 14. In this figure, the total thickness of the first reflector 14, including the silvered side of the first reflector 15 and the protective material, which may be glass, acrylic, or another transparent material, is 3.0 mm. FIG. 1D shows a top plan view of a first reflector 14, which is shown as trapezoidal with a length of 20.0 mm, a narrow end measuring 10.0 mm and a wide end measuring 20.0 mm. FIG. 1E shows a side plan view of a second reflector 16. In this figure, the total thickness of the second reflector 16, including the silvered side of the second reflector 17 and the protective material, which may be glass, acrylic, or another transparent material, is also 3.0 mm. FIG. 1F shows a top plan view of a second reflector 16, which is shown as square with a length and a width of 23.5 mm each.

Figure 2A:
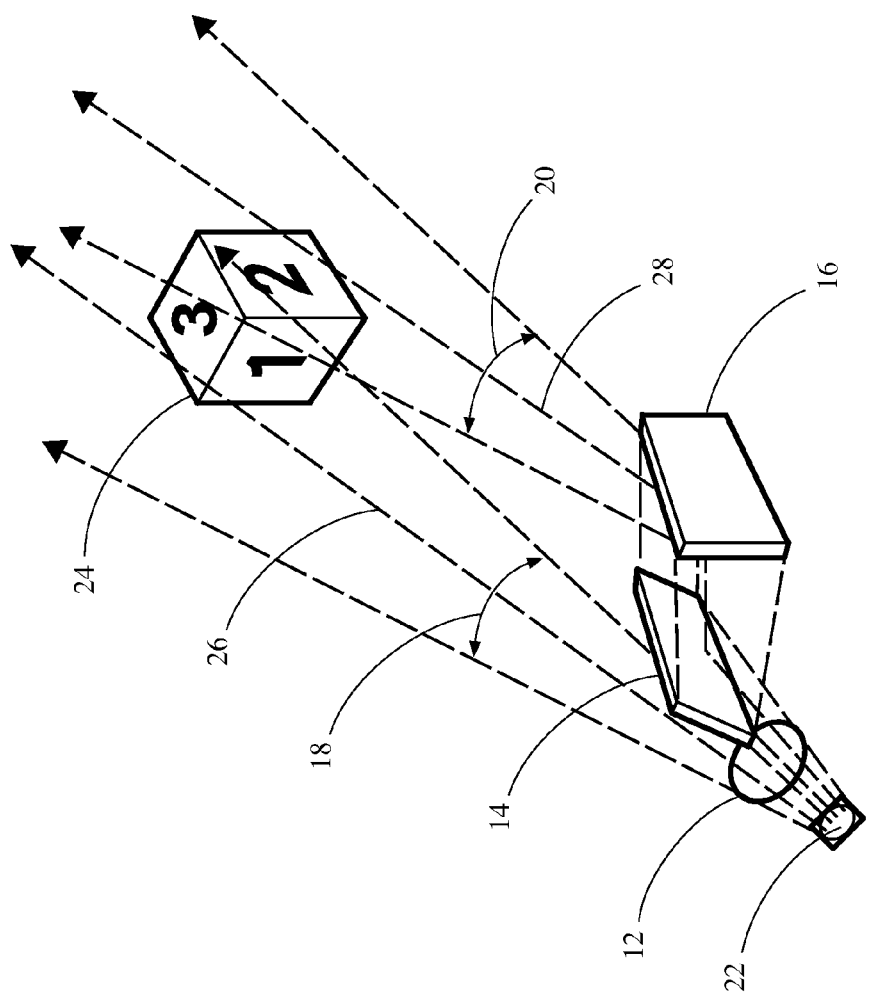
FIG. 2A shows a perspective view of the arrangement of a sensor, a camera lens, a first reflector and a second reflector splitting the field of view towards an object from the lens side.

FIG. 2A shows a perspective view of the arrangement of a sensor 22, a camera lens 12, a first reflector 14 and a second reflector 16 splitting the field of view towards a subject of the field of view 24 from the camera lens 12 side. The dashed lines show the first portion of the field of view 18 and the second portion of the field of view 20 as seen through the camera lens 12 with the left image center 26 and the right image center 28 positioned accordingly and crossing the subject of the field of view 24. This figure shows the entire field of view bisected into the first portion of the field of view 18 and the second portion of the field of view 20 where the first portion of the field of view 18 is an unimpeded, direct view of the subject of the field of view 24 and where the second portion of the field of view 20 is an offset view of the first portion of the field of view 18 as reflected off of the first reflector 14 and the second reflector 16. The sensor 22 is shown positioned behind the camera lens 12 so that it senses the combination of the first portion of the field of view 18 and the second portion of the field of view 20. FIG. 2B shows the stereo camera image 30 produced by the setup of FIG. 2A and the respective memory used to store data for each image. The left image 32 represents the direct view through the first portion of the field of view 18, which is presented based on the data stored in the first memory 31. The right image 34 represents the offset view of the first portion of the field of view 18 as seen through the second portion of the field of view 20, which is presented based on the data stored in the second memory 33.

Figure 3B:
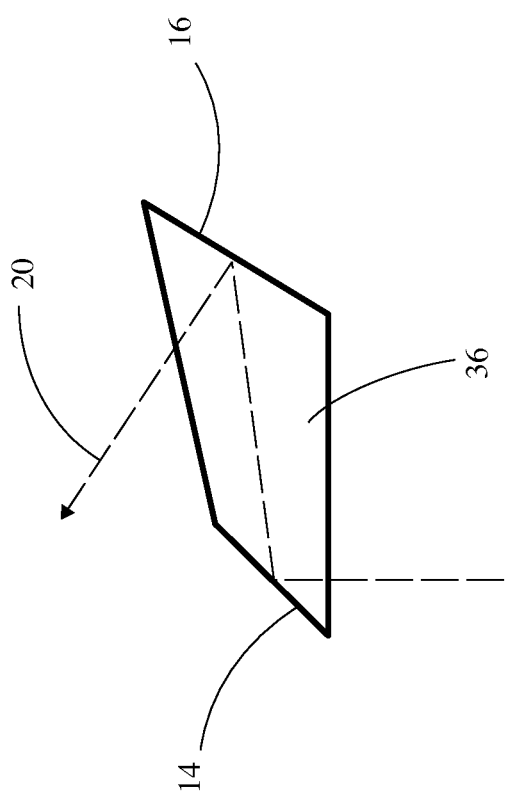
FIG. 3B shows a top view of the optical paths of the offset field of view with a prism used for the first reflector and the second reflector.

FIG. 3A shows a side view of the optical paths of the split fields of view with a prism 36 used for the first reflector 14 and the second reflector 16. The mobile graphical device 10 is shown with the display side facing downward and the camera lens 12 facing upward. In this figure, the first reflector 14 and the second reflector 16 are not shown as mirrors but are shown as interior surfaces of a prism 36. The dashed lines show how light is reflected and represent the first portion of the field of view 18 and the second portion of the field of view 20. The prism 36 is attached to the mobile graphical device 10 using a prism mount 38 that does not interfere with the fields of view. As in the embodiments using mirrors, the field of view through the camera lens 12 is split with a prism 36 in the same manner. FIG. 3B shows a top view of the optical paths of the offset, second portion of the field of view 20 with a prism 36 used for the first reflector 14 and the second reflector 16.

Figure 4A:
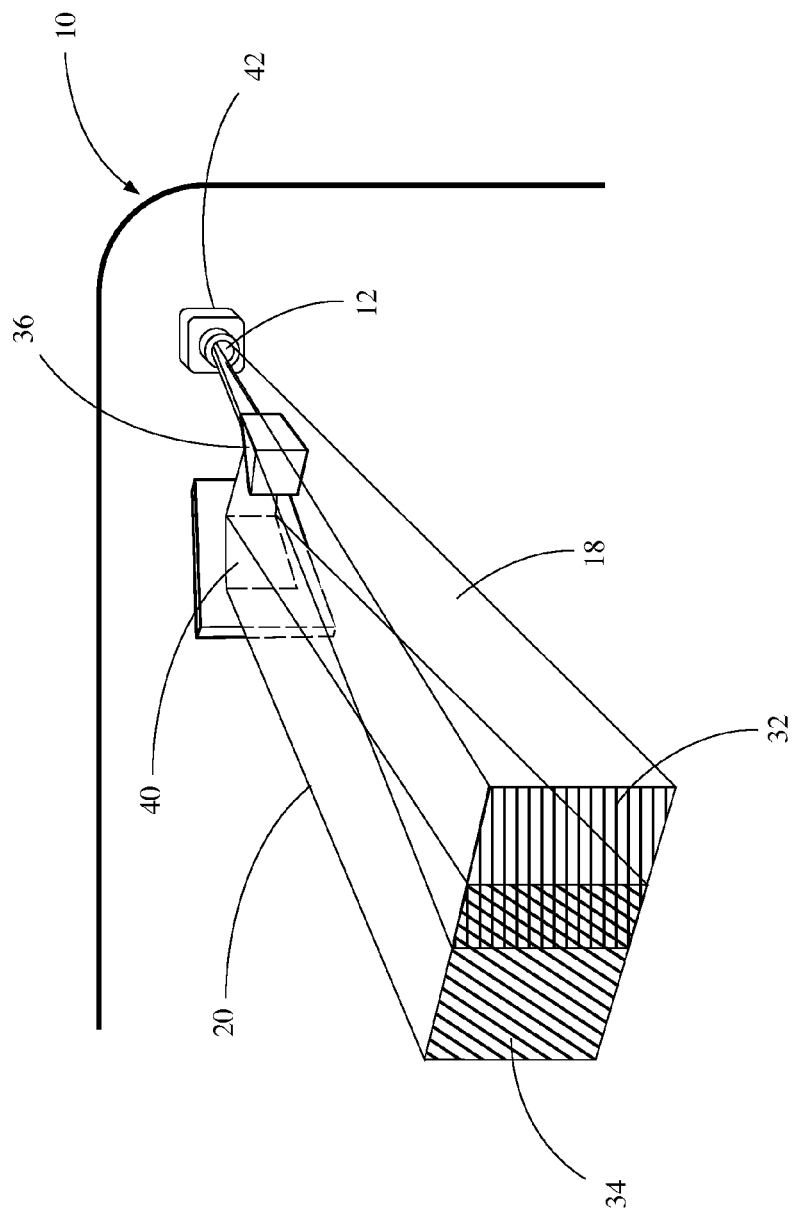
FIG. 4A shows a perspective view of the arrangement of a camera lens of a two-dimensional camera mounted on a mobile graphical device, a prism and a directing mirror splitting the field of view from the image side.
Figure 4B:
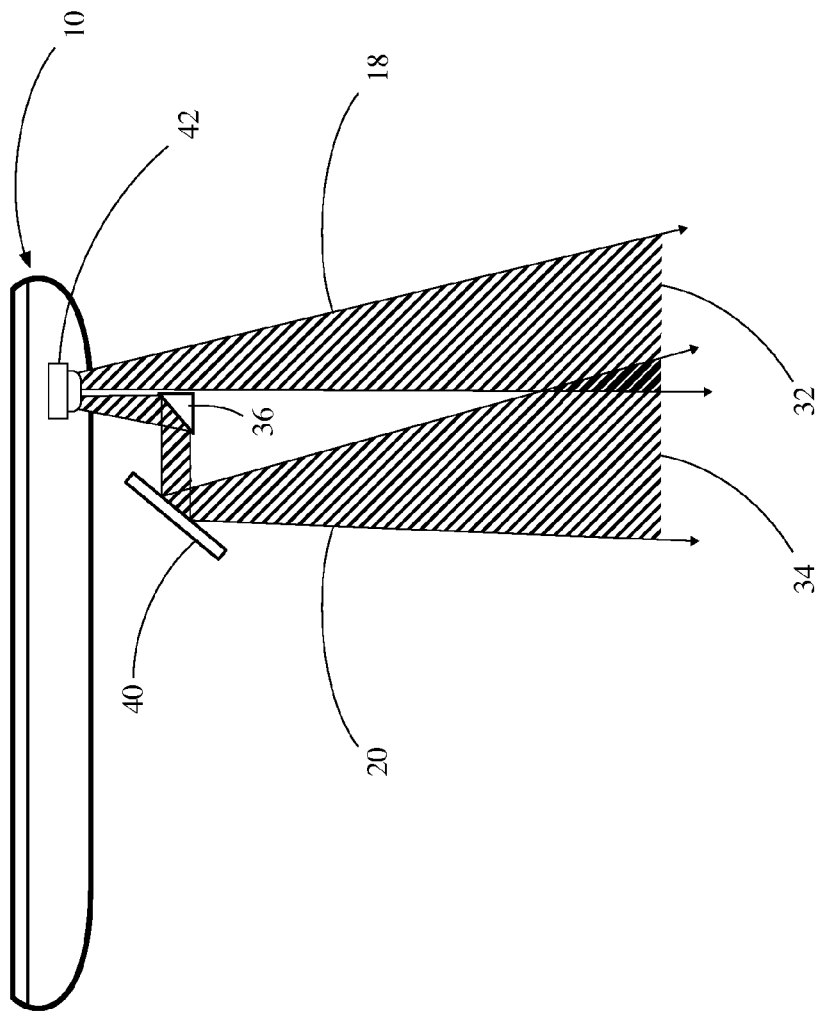
FIG. 4B shows a top view of the arrangement of a two dimensional camera in the mobile graphical device, a prism and a directing mirror splitting the field of view.

FIG. 4A shows a perspective view of the arrangement of a camera lens 12 of a two-dimensional camera 42 mounted on a mobile graphical device 10, a prism 36 and a directing mirror 40 splitting the field of view from the image side. The field of view is shown split into the first portion of the field of view 18 and the second portion of the field of view 20, which are directed to producing a left image 32 and a right image 34, where the first portion of the field of view 18 and the second portion of the field of view 20 are ultimately convergent so that the left image 32 and the right image 34 represent a direct view of the left image 32 and where the right image 34 is an offset view of the left image 32. FIG. 4B shows a top view of the arrangement of a two dimensional camera 42 in the mobile graphical device 10, a prism 36 and a directing mirror 40 splitting the field of view. The first portion of the field of view 18 is shown as a direct view of the left image 32, and the second portion of the field of view 20 is shown as a right image 34, which is an offset view of the left image 32.

Figure 5:
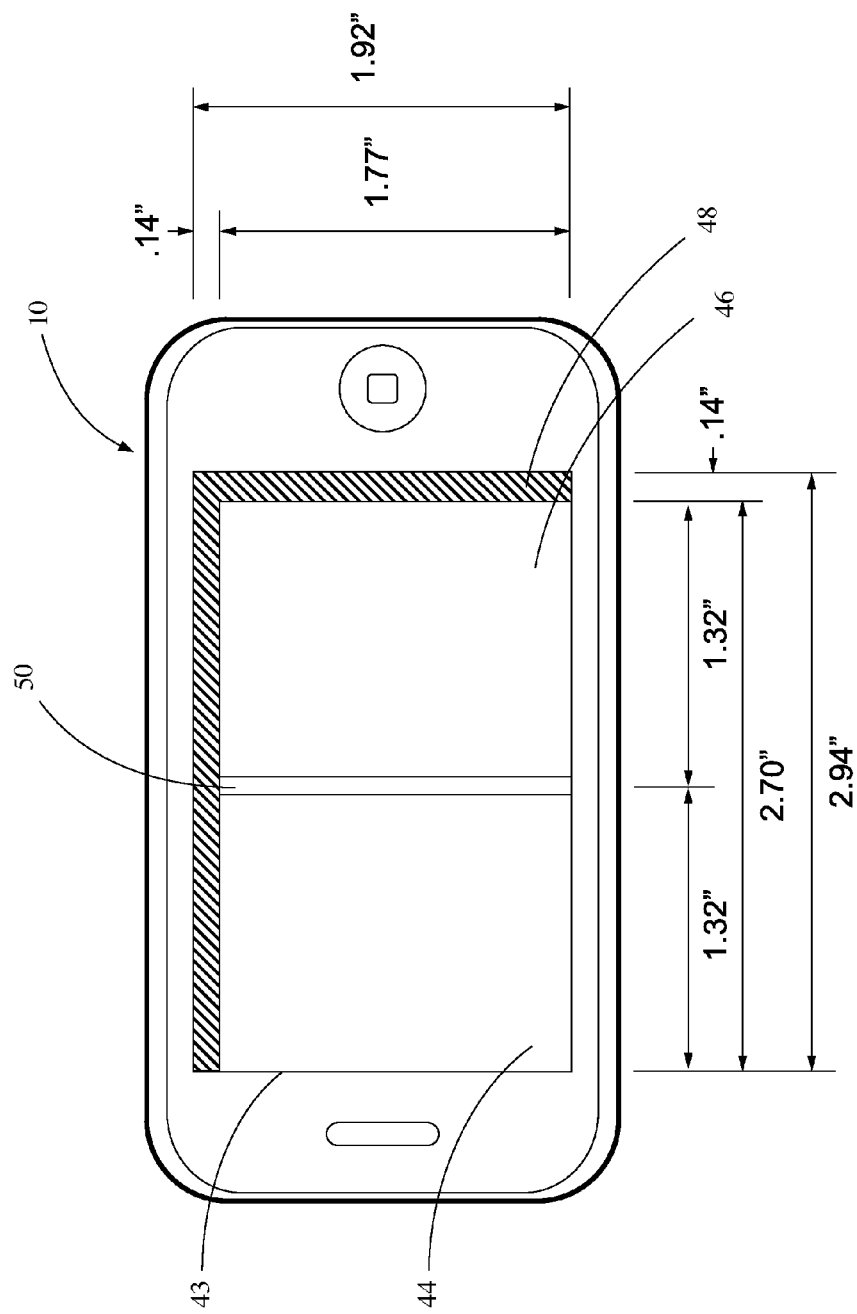
FIG. 5 shows a plan view of the display side of a mobile graphical device.

FIG. 5 shows a plan view of the display side of a mobile graphical device 10. The display 43 is shown divided into a first pane 44 and a second pane 46 with a pane divider 50 in the middle of the first pane 44 and the second pane 46. In this embodiment, the top and the right side of the display 43 is bordered by a user control area 48 that can control user functions when touched by an end user. In the shown embodiment, the display 43 is 2.94 inches along the top and 1.92 inches along the side. The user control area 48 is 2.94 inches along the top, 1.92 inches along the side, and 0.14 inches thick. The first pane 44 and the second pane 46 are each 1.77 inches high and 1.32 inches wide, while the pane divider is 0.6 inches wide. The first pane 44 shows an image representing the first portion of the field of view 18 and the second pane 46 shows an image representing the second portion of the field of view 20. In this example, the first control icon area 54 and the second control icon area 56 will be within the first pane 44 and the second pane 46, respectively. The end user will be able to touch the user control area to activate functions associated with the three-dimensional icons.

FIG. 6A shows a double image and a user control GUI for using a camera as it appears in a two-dimensional, double-paned display 43 of the mobile graphical device 10. The first pane 44 shows a left image 32 and the second pane 46 shows a right image 34. The first control icon area 54 and the second control icon area 56 show icons that may be used in this user interface. For example, from left to right in both panes, the icons may be used to select this particular user interface, to go back to a previous user interface, to choose the type of file to be created as a camera file, and to take a picture. While a user is setting up to take a picture and viewing a live scene, the first pane 44 contains a first live image view 52 and the second pane 46 contains a second offset live image view 53. FIG. 6B shows a single image and a user control GUI for using a camera as it appears in a three-dimensional, single pane on the display 43 of the mobile graphical device 10. In the view shown in FIG. 6B, which is a three-dimensional view of the split image, the user sees the first live image view 52 in a single pane. Additionally, the icons in the control icon area will also appear as three-dimensional.

Figures 6C, 6D:
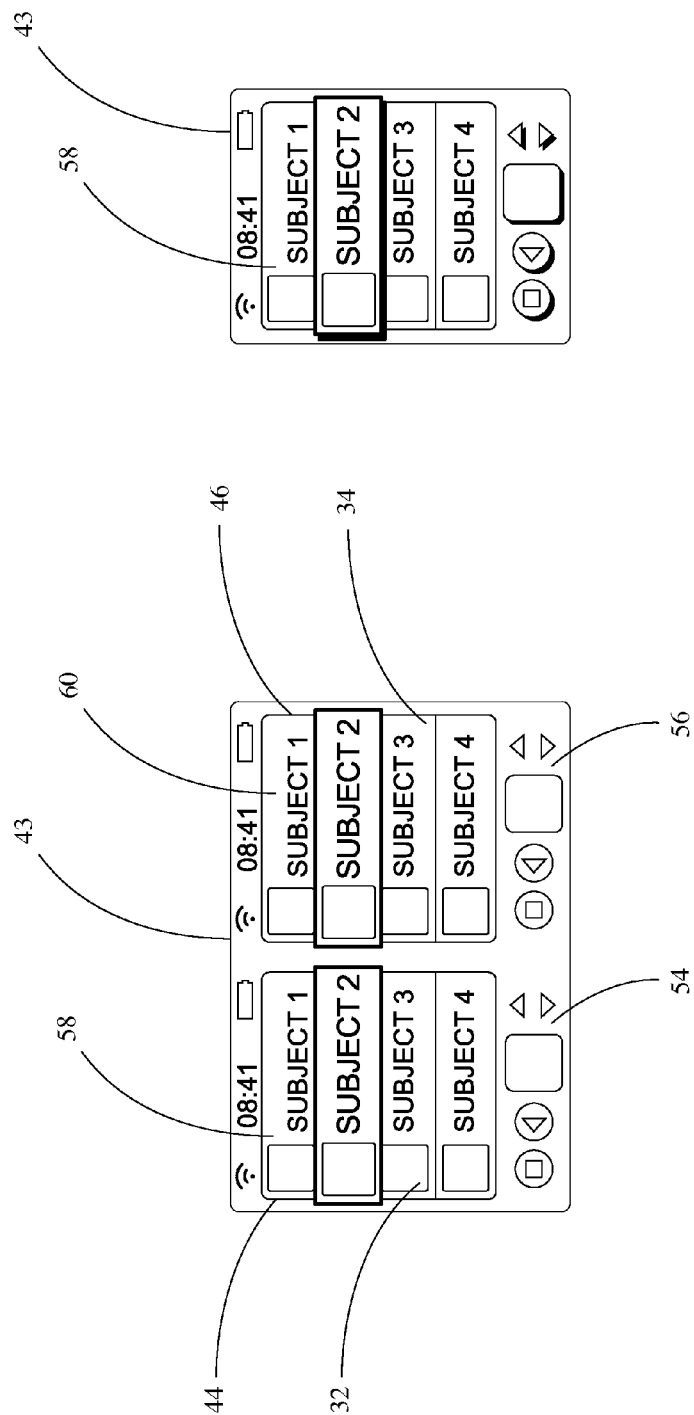
FIG. 6C shows a double image and a user control GUI for viewing photographs as it appears in a two-dimensional, double-paned display of the mobile graphical device.
FIG. 6D shows single image and a user control GUI for viewing photographs as it appears in a three-dimensional, single pane on the display of the mobile graphical device.

FIG. 6C shows a double image and a user control GUI for viewing photographs as it appears in a two-dimensional, double-paned display 43 of the mobile graphical device 10. The first pane 44 shows a left image 32 and the second pane 46 shows a right image 34. The first control icon area 54 and the second control icon area 56 show icons that may be used in this user interface. For example, from left to right in both panes, the icons may be used to select this particular user interface, to go back to a previous user interface, to choose the type of file to be viewed as a photo file, and to move up and down the list of photo categories. While a user is using the interface to view photographs, the first pane 44 contains a first photo library list 58 and the second pane 46 contains a second photo library list 60. FIG. 6D shows single image and a user control GUI for viewing photographs as it appears in a three-dimensional, single pane on the display of the mobile graphical device 10. In the view shown in FIG. 6D, which is a three-dimensional view of the split image, the user sees the first photo library list 58 in a single pane. Additionally, the icons in the control icon area will also appear as three-dimensional.

Figure 7A:
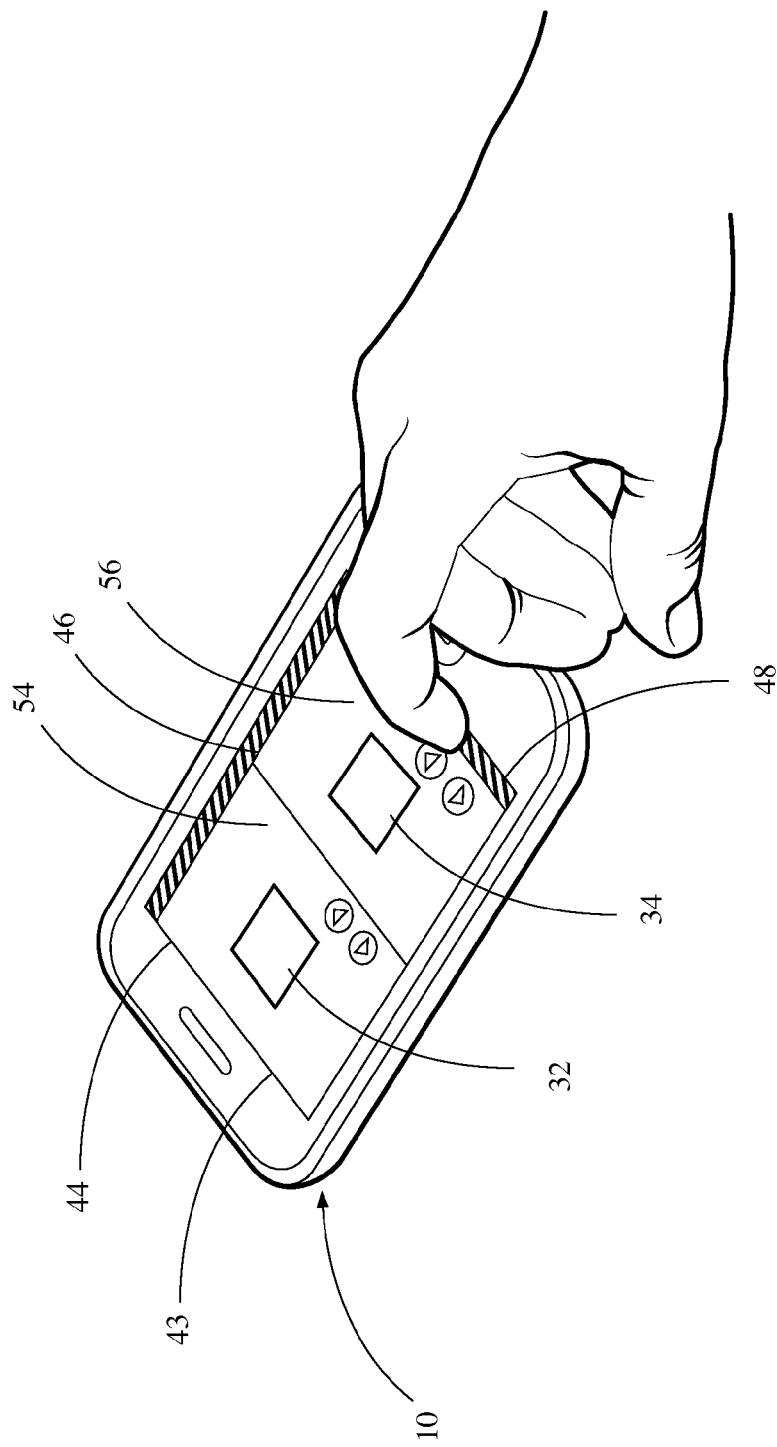
FIG. 7A shows a perspective view of the display of a mobile graphical device with split images, user control icons, and a user control area as it appears in a two-dimensional view without using eye lenses.
Figure 7B:
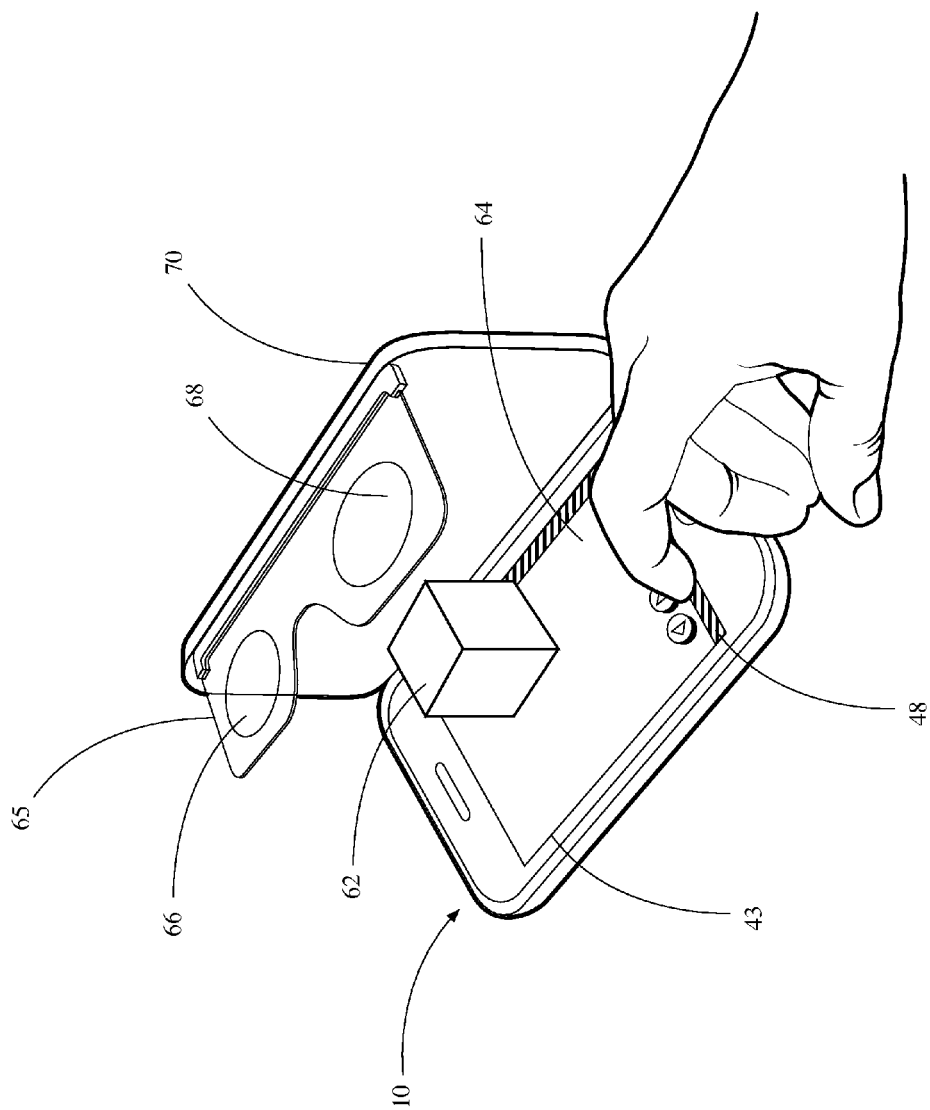
FIG. 7B shows a perspective view of the display of a mobile graphical device with an image, user control icons, and a user control area as it appears in a three-dimensional view using eye lenses.

FIG. 7A shows a perspective view of the display 43 of a mobile graphical device 10 with split images, user control icons, and a user control area 48 as it appears in a two-dimensional view without using eye lenses. The first pane 44 shows a left image 32, which in this case is a square. The second pane 46 shows a right image 34, which in this case is also a square. The first pane 44 also contains the first control icon area 54, and the second pane 46 contains the second control icon area 56. This figure shows a mobile graphical device 10, such as an iPhone™, as it appears in a two-dimensional mode with no attachments to provide three-dimensional viewing. FIG. 7B shows a perspective view of the display 43 of a mobile graphical device 10 with a three-dimensional image 62, three-dimensional user control icons 64, and a user control area 48 as it appears in a three-dimensional view using glasses 65 with a first eye lens 66 and a second eye lens 68. In this figure, a cradle 70 is configured to receive the mobile graphical device 10 and any accessories related to the mobile graphical device 10, such as a camera and its associated sensors and memory.

With reference to the display 43 of the mobile graphical device 10, the three-dimensional image 62 is facilitated with user control icons 64 at user control area 48 for three-dimensional viewing and navigation. User navigation with associated screens of the user control GUI is achieved, e.g., as virtual rooms or various game environments such that the user is allowed to turn or rotate with head movements, gestures and the like via the mobile graphical device 10 in any direction to interact, participate in game play, or observe and select different menu items where the user looks. Additionally users may make tap entries on-screen to make appropriate game selections. Screen buttons are placed on the bottom/left or bottom/right side portions of the screen in user control area 48, and as discussed further below, a plurality of user thumb or finger openings positioned at the bottom of the viewer apparatus housing 76 allow for advantageous relative positions where users can make screen selections during game play.

To this end, the primary interactions are typically directed to the lower portion of the screen to minimize visual disruption and smearing of the screen. Virtual interactive buttons and controls may be limited, spaced, or sized for easy targeting to alleviate difficulty in placing fingers/thumbs when viewing the stereoscopic imagery. Where appropriate, swipe up/down and other gestures inherent to the mobile graphical device 10 can be enabled as a secondary or redundant mode of interaction. User games and Explore modes use the navigation and control GUI to allow the user to enter into a 360° scene, choose from available objects such as floating icons and the like. For example, a trivia game may be presented with subjects for a multiple choice, text-based trivia questions. The available subjects in the scene allow the user to aim the headset at the correct answer. Other skill games may utilize the three-dimensional stereoscopic platform to test user skill and balance as they navigate, e.g., a rolling ball through a whimsical abstract virtual environment where users are challenged to avoid hazards and traps while navigating to the finish line before a timer runs out.

Figure 8:
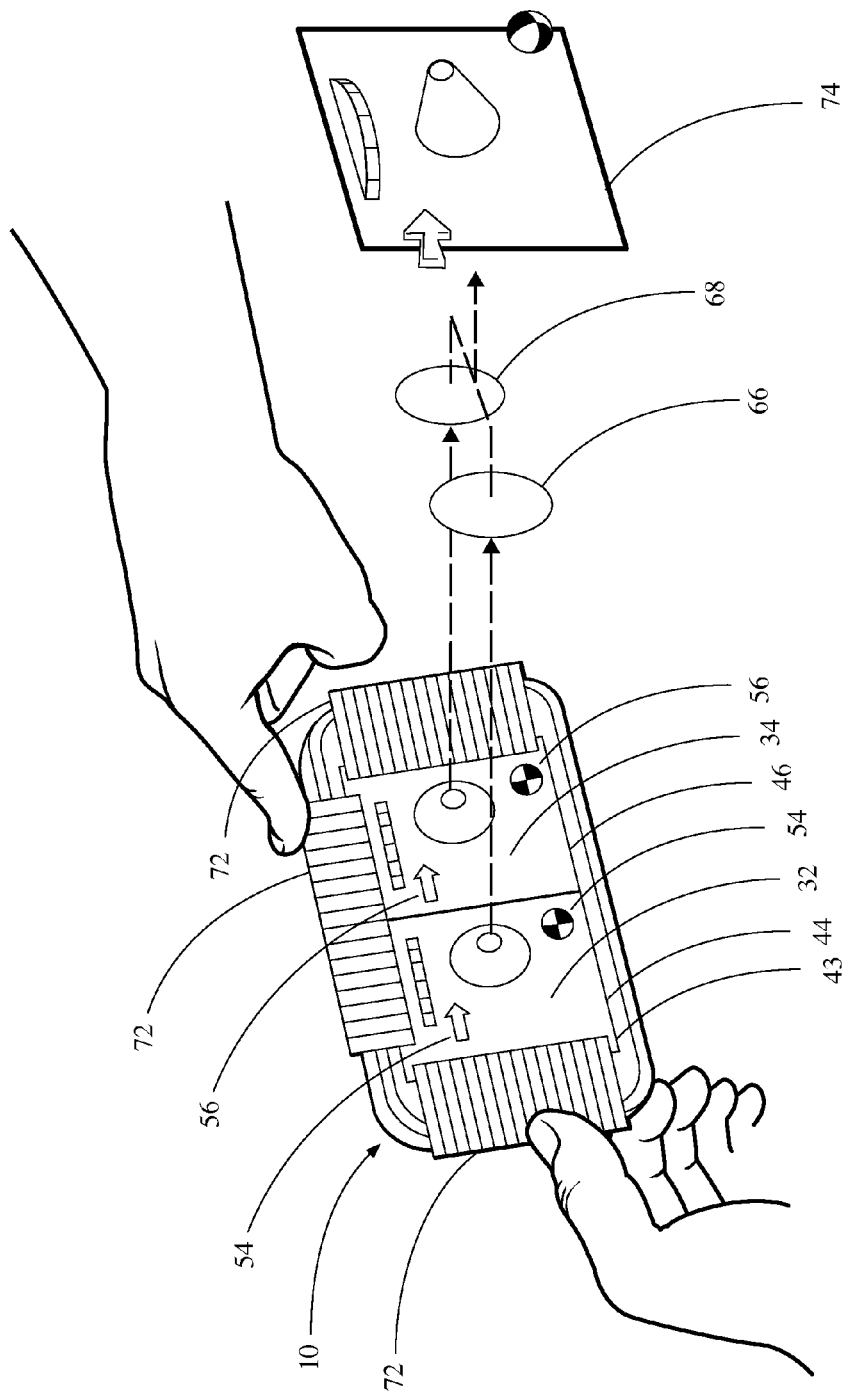
FIG. 8 shows a perspective view of how the GUI may be controlled with zebra strips.

FIG. 8 shows a perspective view of how the GUI may be controlled with zebra strips 72, such as ZEBRA™ elastomeric electronic connectors from Fujipoly, although other similar products may be used. For example, as described thus far, a mobile graphical device 10 having a display 43 with a first pane 44 showing a left image 32 and a second pane 46 showing a right image 34 where the first pane 44 has a first control icon area 54 and the second pane 46 has a second control icon area 56 may use the zebra strips 72 instead of a user control area 48 to allow the user to select icon functionality while keeping the user's fingers out of the view of the display 43. Thus, the display 43 as seen by the user through the first eye lens 66 and the second eye lens 68 will appear unblocked by fingers as a three-dimensional image with three dimensional icons as the image in the viewer's brain 74.

Figure 9:
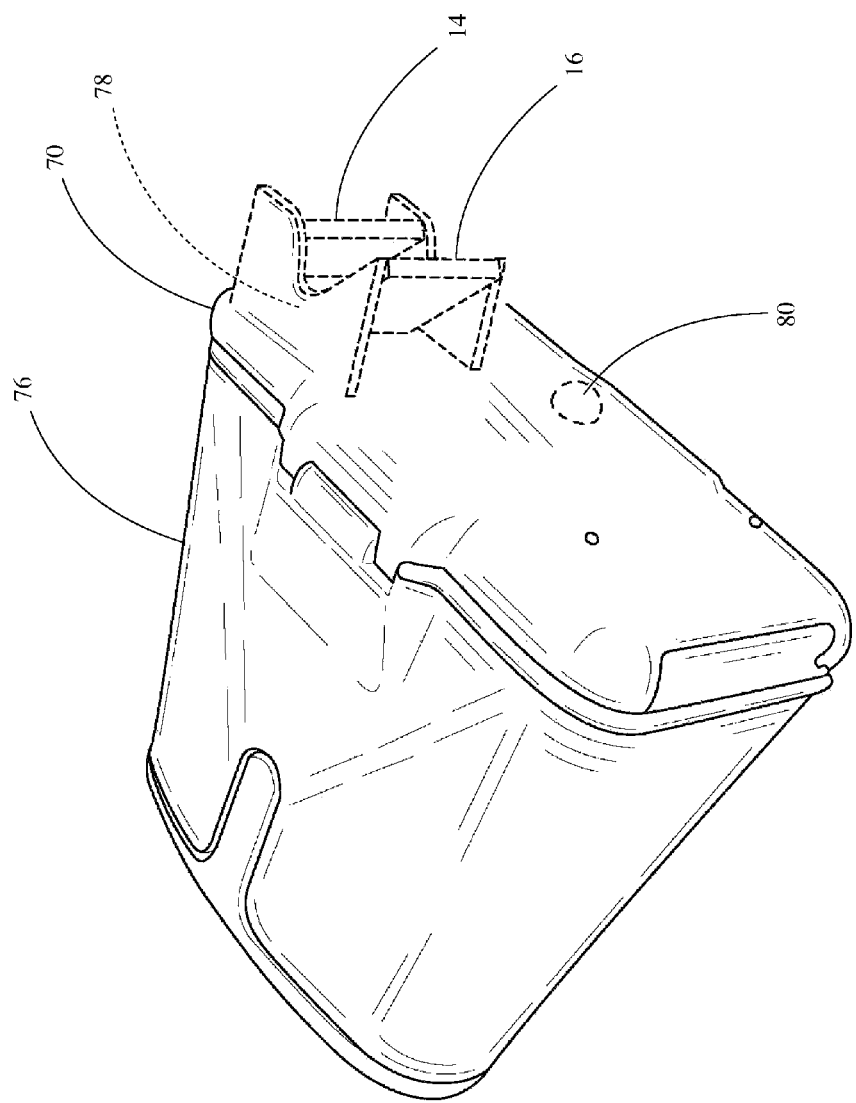
FIG. 9 shows a perspective view of the top of a viewer apparatus with a housing and a cradle and lenses coupled thereto.
Figure 10:
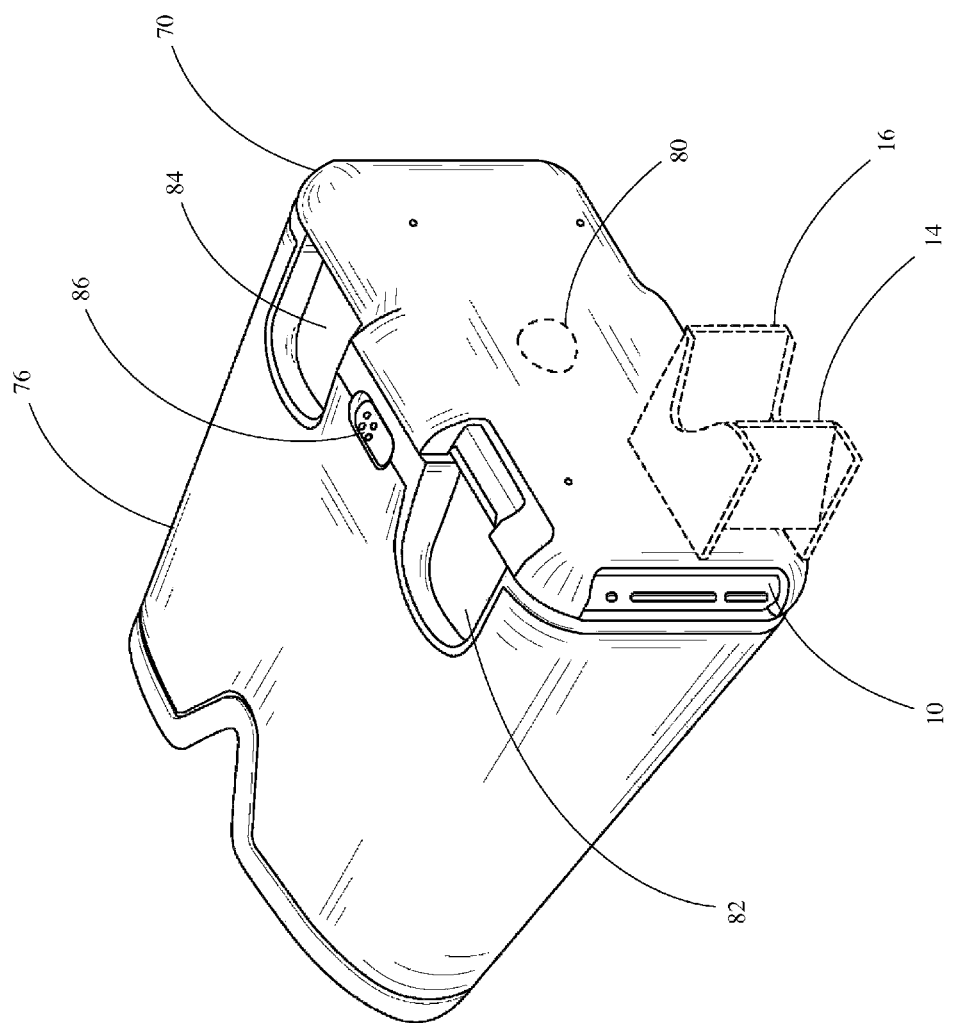
FIG. 10 shows a perspective view of the bottom of the viewer apparatus.

FIG. 9 shows a perspective view of the top of a viewer apparatus with a housing 76 and a cradle 70 and lenses coupled thereto. The first reflector 14 and the second reflector 16 are shown coupled to the combination of the cradle 70 and the housing 76. Between the first reflector 14 and the second reflector 16 is an aperture 78 in the cradle 70 and/or the housing 76 that may align with a camera. Also shown in this figure is a base support 80 for when a user wishes to balance the viewer apparatus on a support surface for viewing through the opposite end. FIG. 10 shows a perspective view of the bottom of the viewer apparatus. The housing 76, the cradle 70, the first reflector 14, the second reflector 16, and the base support 80 are shown from a viewpoint opposite that shown in FIG. 9. Also shown in FIG. 10 is the mobile graphical device 10 as it is received by the cradle 70, as well as a first thumb hole 82 and a second thumb hole 84 that allow a user to control user interfaces as previously described. Holes may be placed elsewhere in the housing for finger control if so desired. A cradle latch 86 is further shown in this figure. The cradle latch 86 may be used to lock and release the cradle 70 to and from the housing 76 so that the mobile graphical device 10 may be inserted into and removed from the apparatus.

Figure 11:
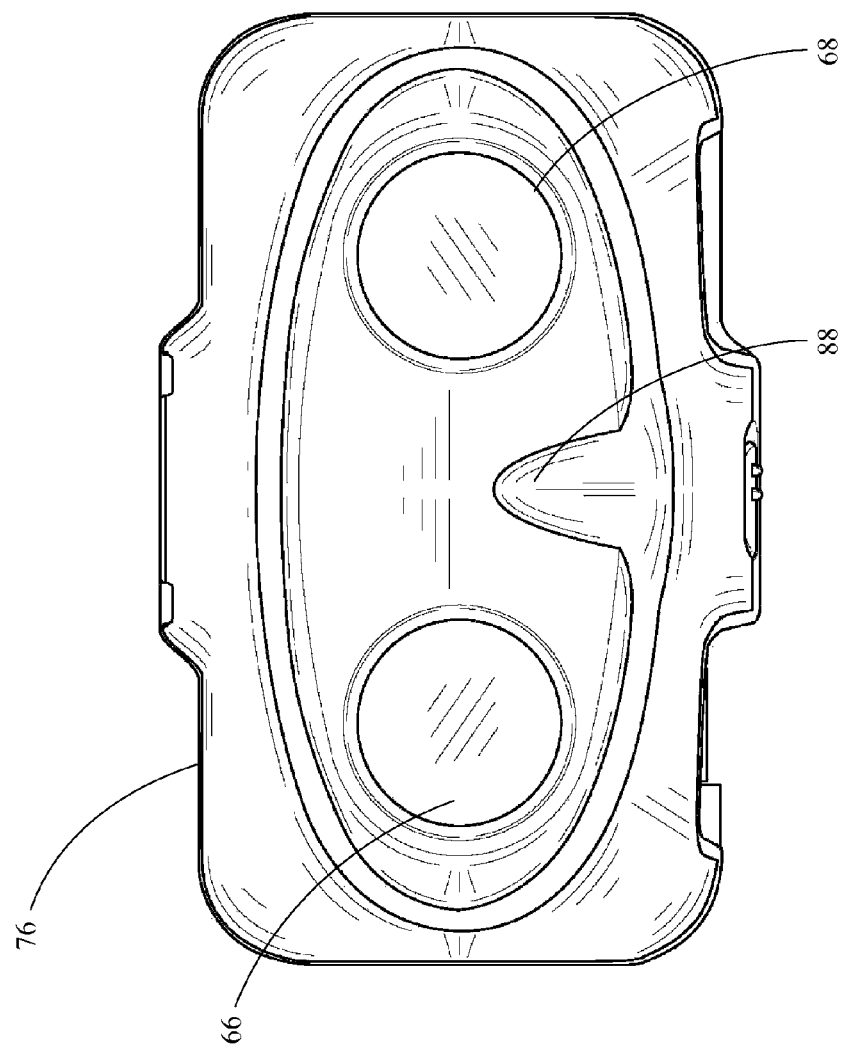
FIG. 11 shows a front elevational view of the viewer apparatus.
Figure 12:
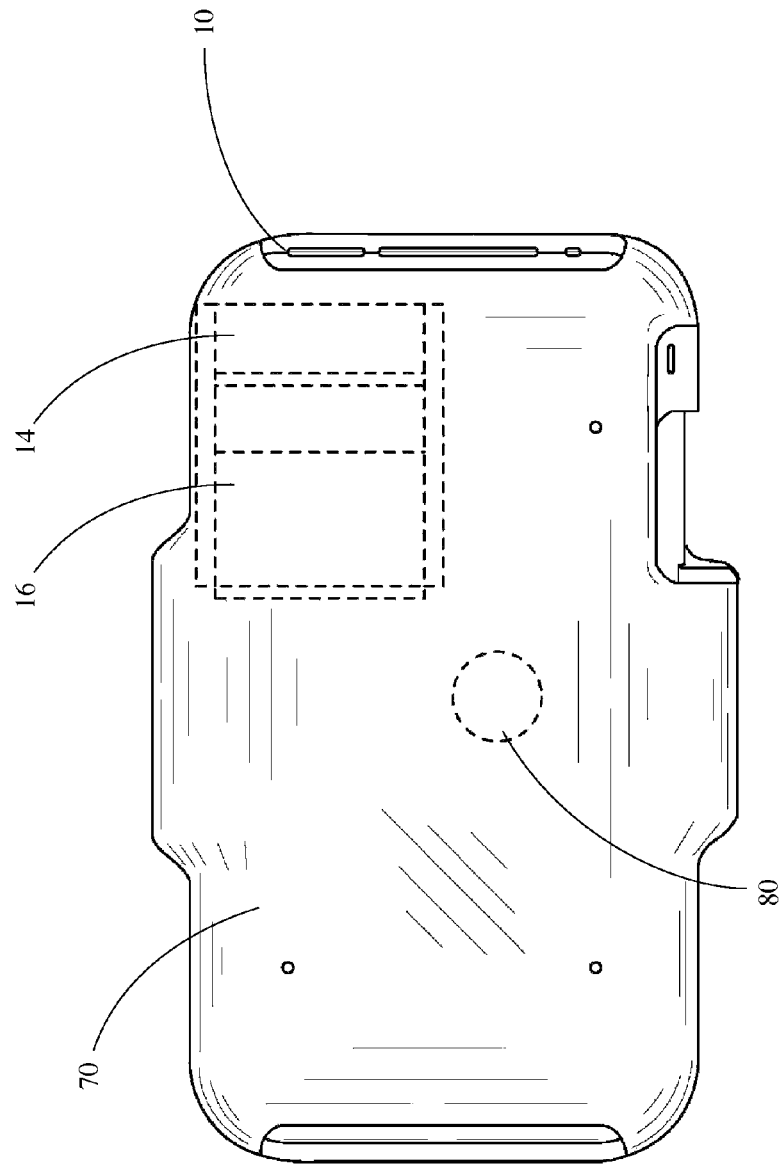
FIG. 12 shows a rear elevational view of the viewer apparatus.

FIG. 11 shows a front elevational view of the viewer apparatus. This view shows what a user sees when putting the viewer apparatus to the user's eyes. The viewer sees the front of the housing 76, which has the first eye lens 66 and the second eye lens 68 and a nose slot 88 so that the user may place the viewer apparatus unimpeded to the user's eyes. FIG. 12 shows a rear elevational view of the viewer apparatus. This view shows the viewer apparatus facing away from the viewer as the viewer looks into the apparatus. The cradle 70 is shown holding the mobile graphical device 10 and the tops of the first reflector 14 and the second reflector are also shown along with the base support 80.

Figure 13:
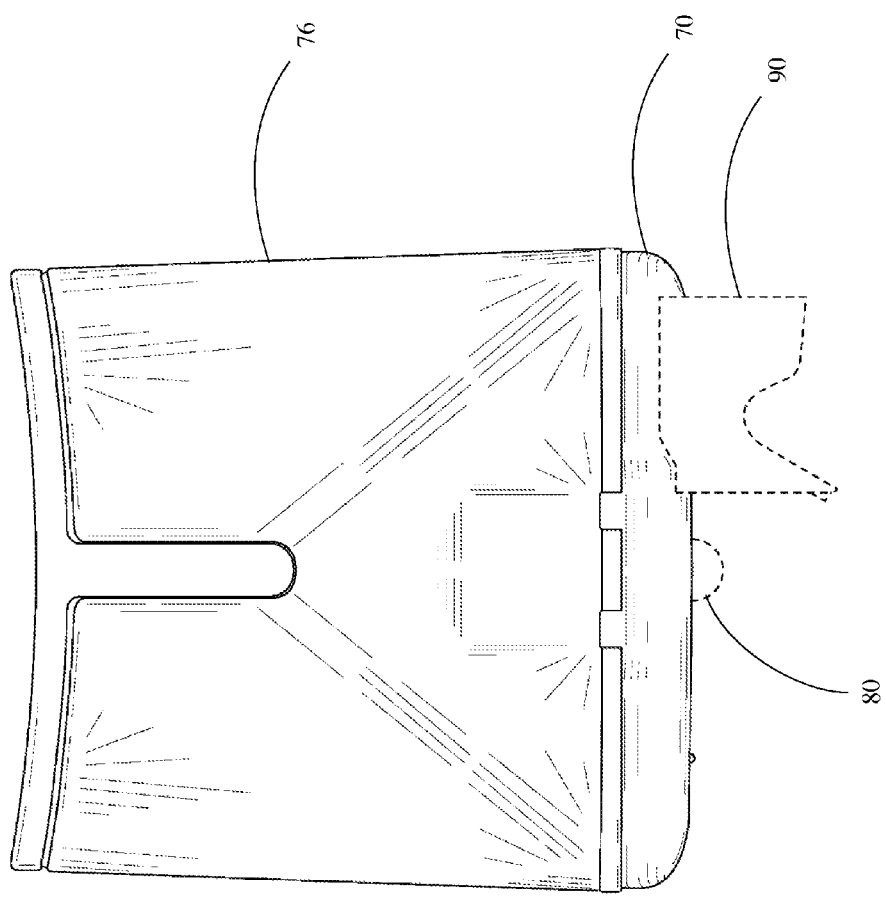
FIG. 13 shows a top elevational view of the viewer apparatus.
Figure 14:
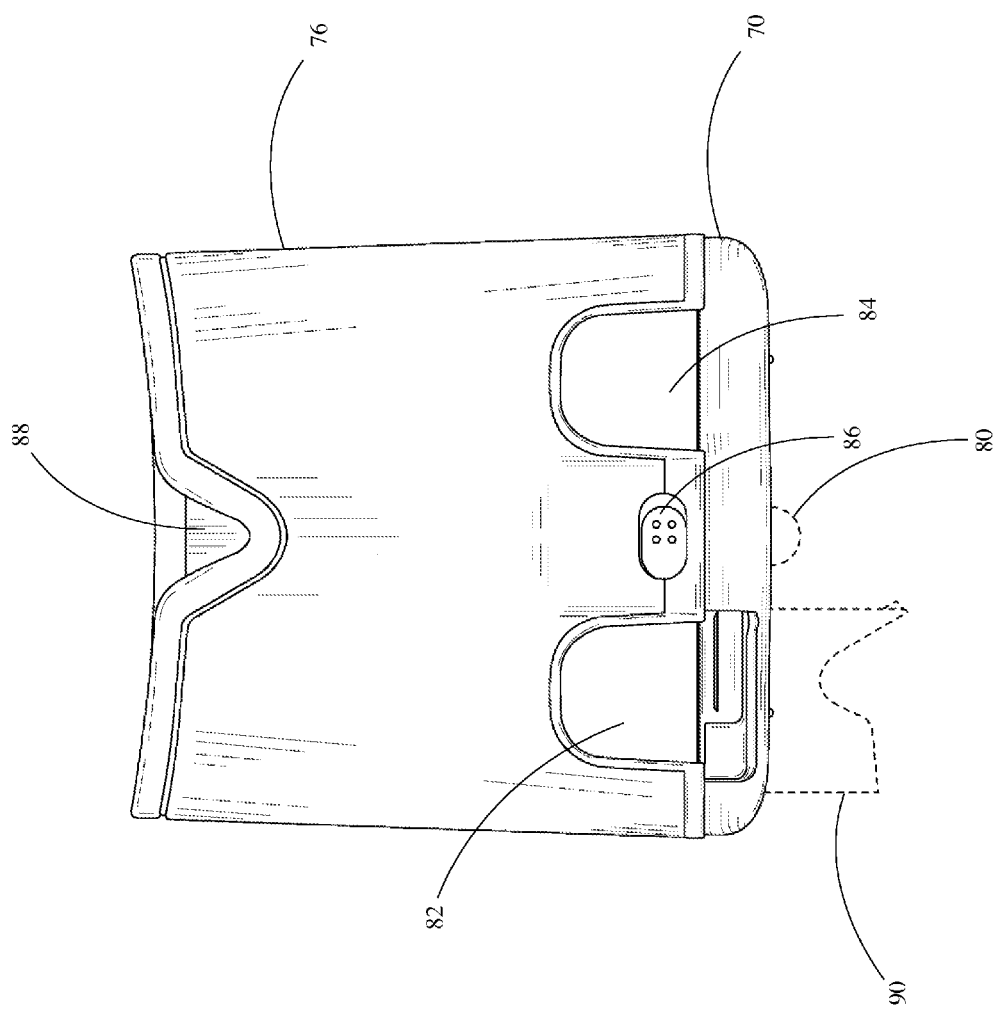
FIG. 14 shows a bottom elevational view of the viewer apparatus.

FIG. 13 shows a top elevational view of the viewer apparatus showing the relative positions of the cradle 70, the housing 76 and the base support 80 from this angle. Also shown is a reflector mount 90 that holds the reflectors in place. FIG. 14 shows a bottom elevational view of the viewer apparatus showing the relative positions of the previously described cradle 70, housing 76, base support 80, first thumb hole 82, second thumb hole 84, cradle latch 86 and nose slot 88.

Figure 15:
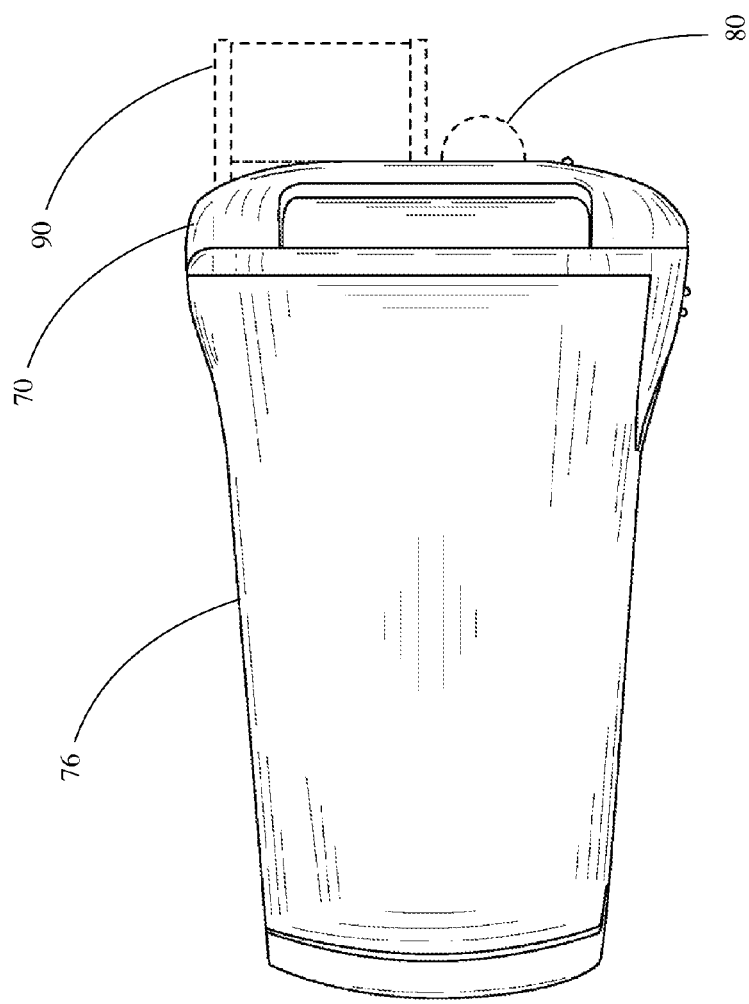
FIG. 15 shows a left side view of the viewer apparatus.
Figure 16:
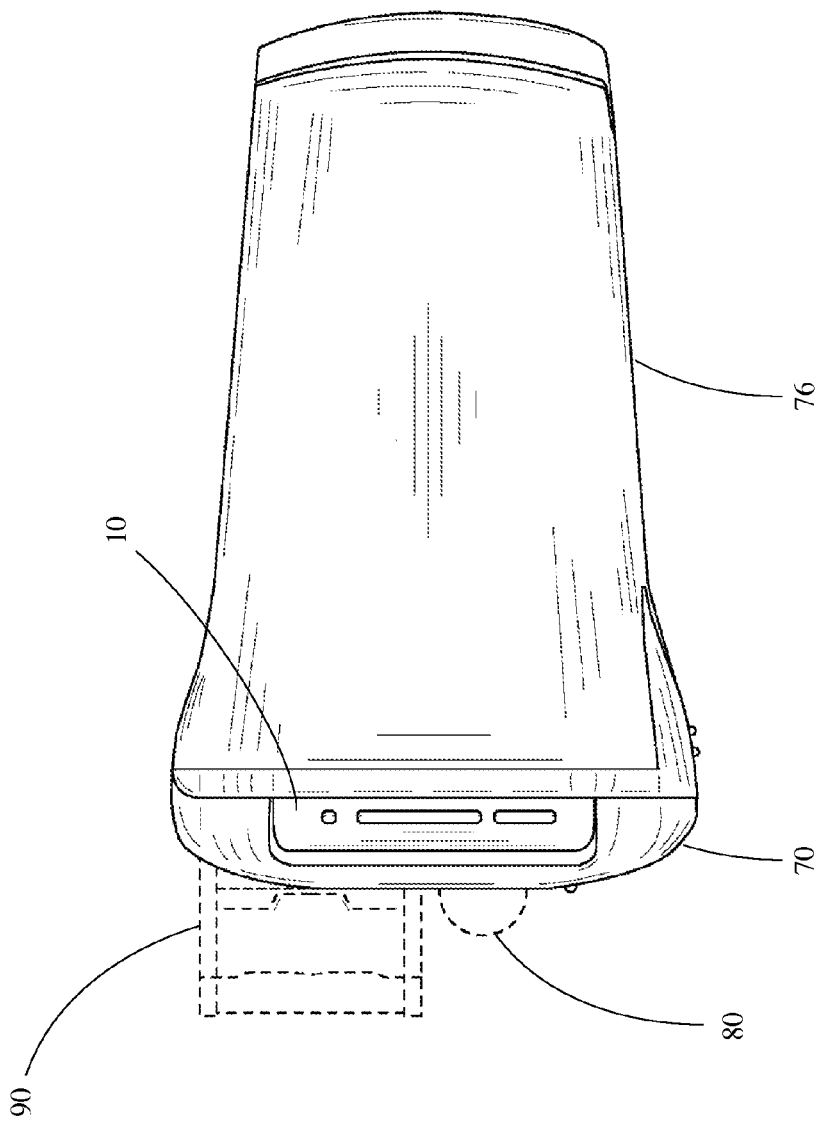
FIG. 16 shows a right side view of the viewer apparatus.

FIG. 15 shows a left side view of the viewer apparatus and FIG. 16 shows a right side view of the viewer apparatus. Both of these figures show the relative positions from both sides of the cradle 70, the housing 76, the base support 80 and the reflector mount 90. FIG. 16 further shows another angle of the mobile graphical device 10 positioned in the cradle 70.

Figure 17:
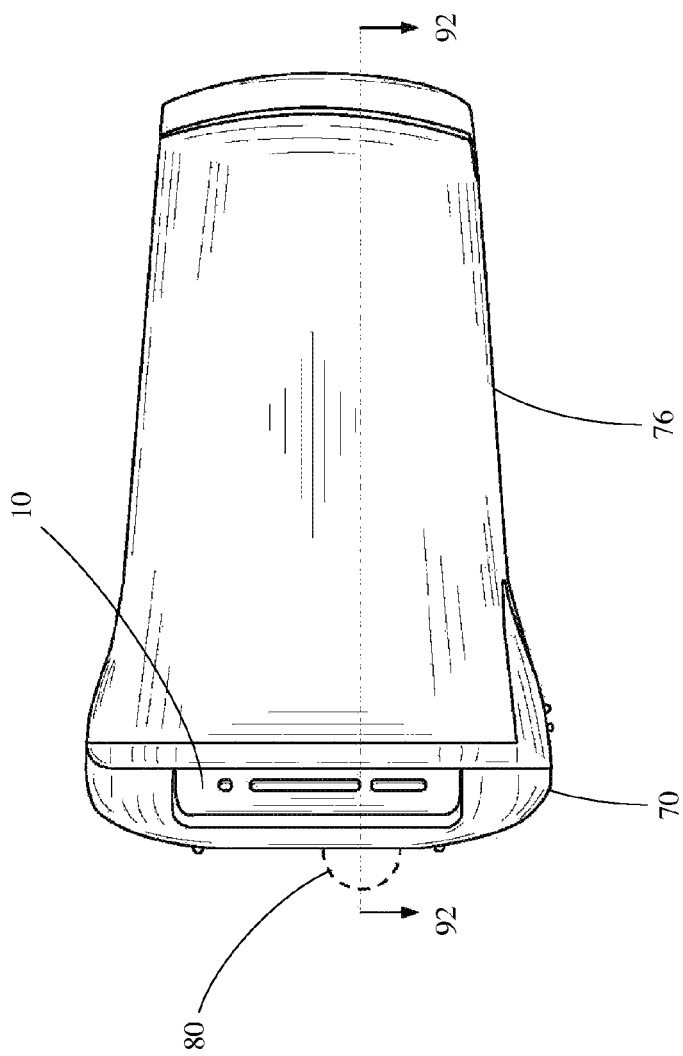
FIG. 17 shows a right side view of the viewer apparatus housing and cradle marked for the cross-sectional view of the following figure.

FIG. 17 shows a right side view of the viewer apparatus housing 76 and cradle 70 marked for the cross-sectional view of the following figure. As in FIG. 16, this figure shows the relative positions from the right side of the cradle 70, the housing 76, the base support 80, the reflector mount 90, and the mobile graphical device 10 positioned in the cradle 70. This figure also shows a cross-sectional cut line 92 to show the location of the cross-sectional view shown in FIG. 18.

Figure 18:
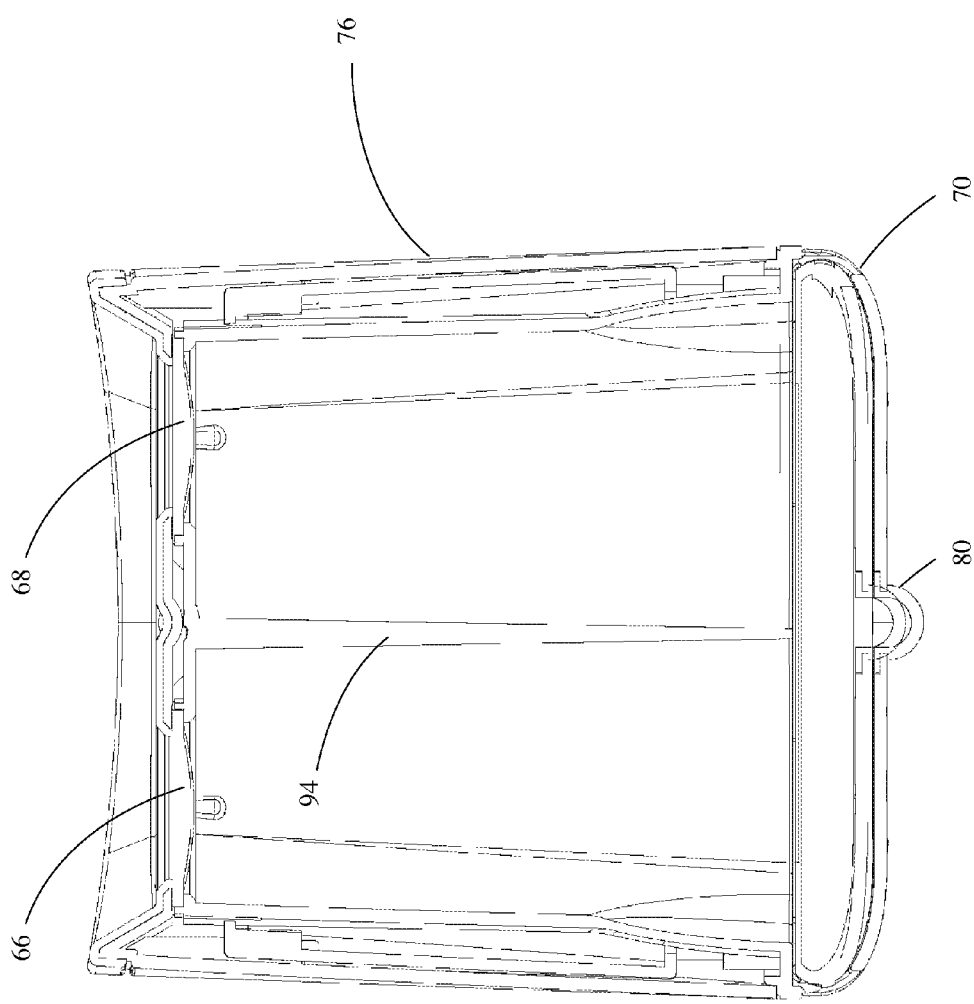
FIG. 18 shows a cross-sectional view of the viewer apparatus housing and cradle.

FIG. 18 shows a cross-sectional view of the viewer apparatus housing 76 and cradle 70. From this angle, the relative positions of the cradle 70, the housing 76, the base support 80, the first eye lens 66 and the second eye lens 68 are shown. Also shown is a view divider 94 that separates the inside of the housing 76 so that a viewer, when looking through the first eye lens 66, will only see the left image 32 in the first pane 44 and, when looking through the second eye lens 68, will only see the right image 34 in the second pane 46.

Figure 19:
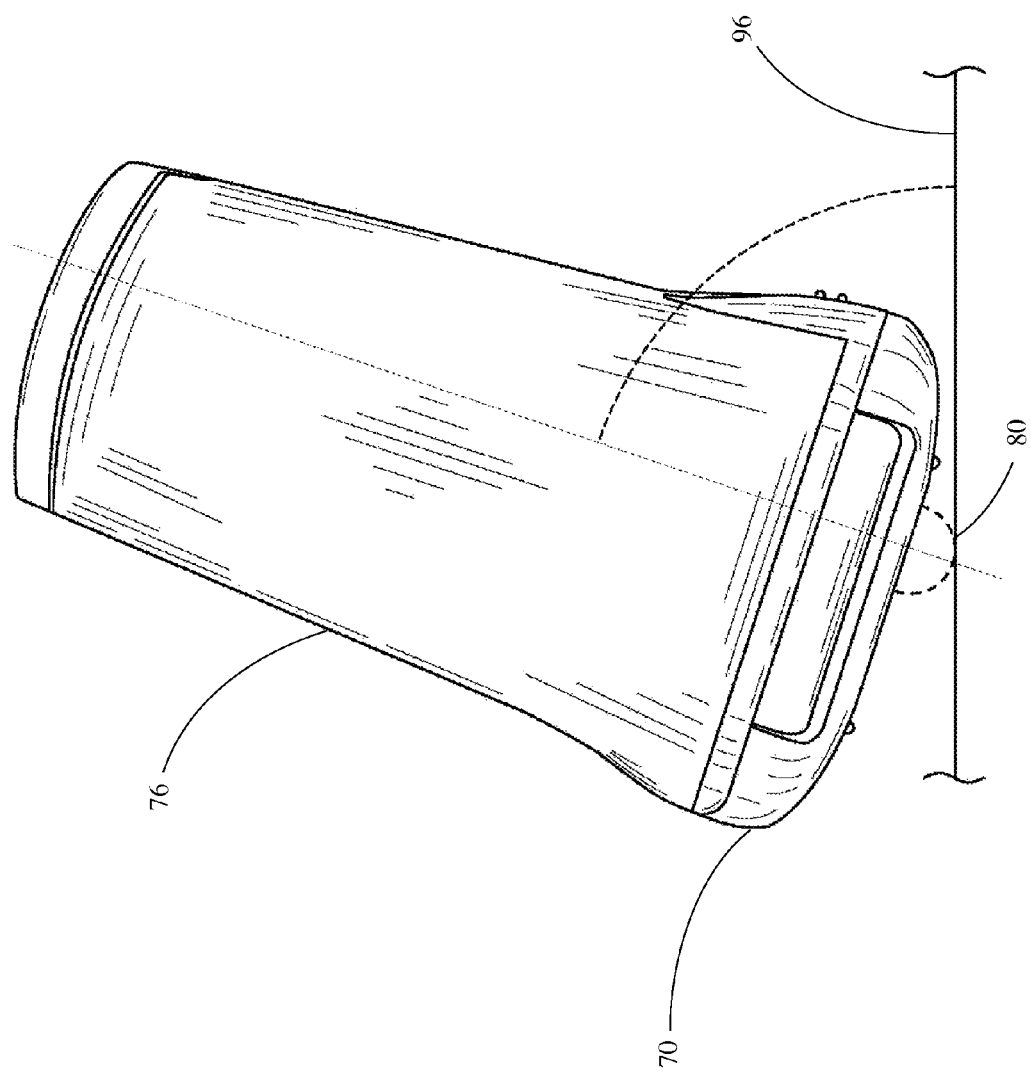
FIG. 19 shows a right side view of the viewer apparatus housing and cradle as balanced on a supporting surface for viewing.

FIG. 19 shows a right side view of the viewer apparatus housing 76 and cradle 70 as balanced on a supporting surface 96 for viewing with the base support 80 supporting the apparatus.

Figure 20A:
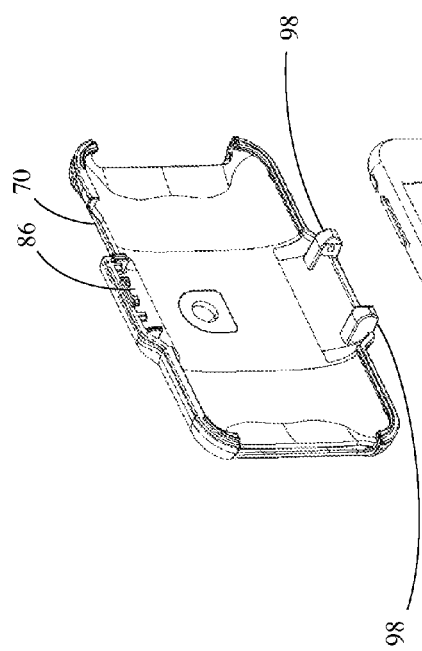
FIG. 20A shows a perspective view of a sample cradle used for receiving a mobile graphical device.
Figure 20B:
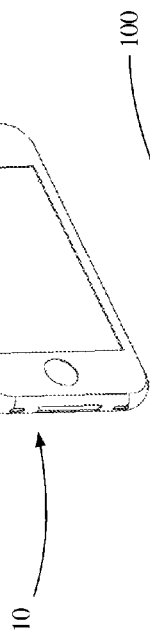
FIG. 20B shows a perspective view of a mobile graphical device.
Figure 20C:
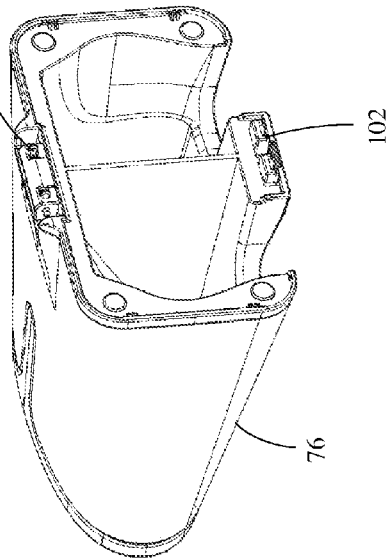
FIG. 20C shows a perspective view of a housing.

FIG. 20A shows a perspective view of a sample cradle 70 used for receiving a mobile graphical device 10. The cradle latch 86 is shown on top and is used to latch the cradle 70 to the housing 76. A pair of cradle snaps 98 are shown and are for snapping into a latch on the housing 76 so that the cradle 70 may pivot and enclose the mobile graphical device 10 within the cradle 70 and the housing 76. FIG. 20B shows a perspective view of a mobile graphical device 10 oriented to be received by the cradle 70. The cradle 70 in FIG. 20A is sized to act as a fastener for securing the mobile graphical device 10. FIG. 20C shows a perspective view of a housing 76. A spring latch 100 is shown that receives the cradle snap 98 shown in FIG. 20A and allows the cradle 70 to pivot into the housing 76 and snap closed. A housing snap 102 secures the cradle 70 to the housing 76 by coupling with the cradle latch 86 shown in FIG. 20A.

Figure 21:
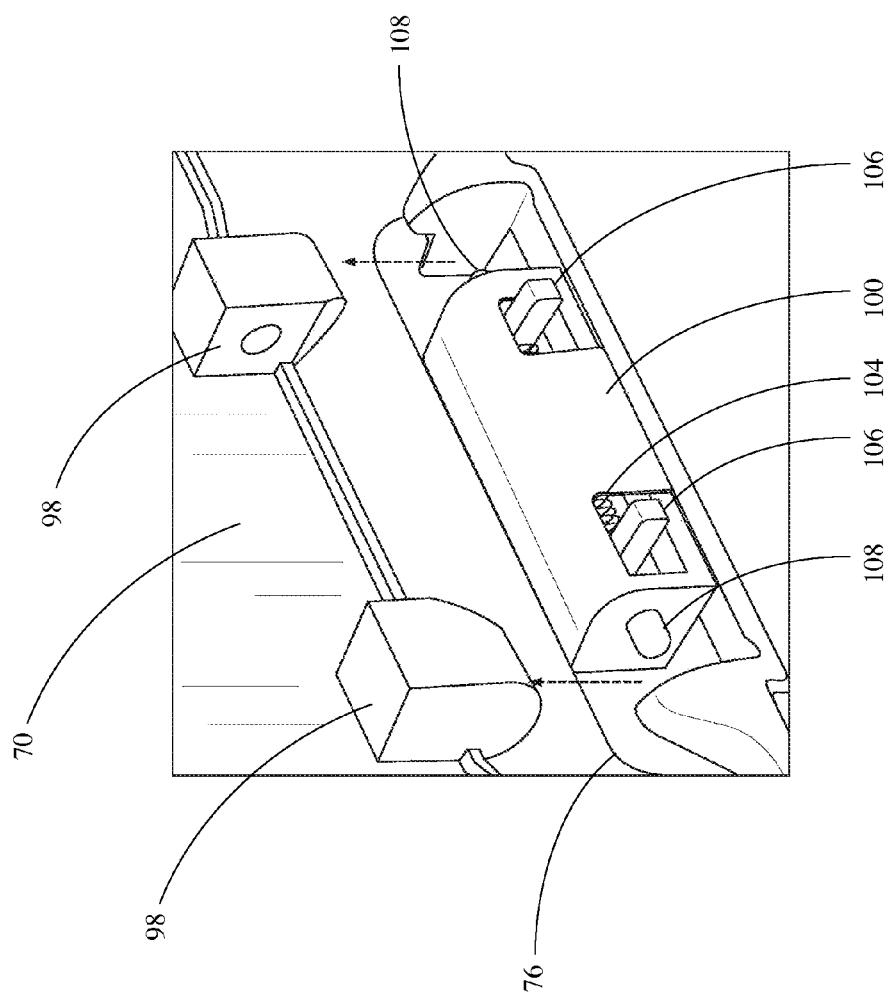
FIG. 21 shows a perspective view of how a sample cradle attaches to a housing.

FIG. 21 shows a perspective view of how a sample cradle 70 attaches to a housing 76. The cradle 70 has a pair of cradle snaps 98 that attach to a spring latch 100. The spring latch 100 comprises a spring 104 and a pair of spring close tabs 106 that can be compressed to move a pair of dowels 108 into the body of the spring latch. The cradle snaps 98 have holes that can be positioned to receive the dowels 108 when the spring close tabs 106 are released, thus attaching the cradle 70 to the housing 76. FIG. 22A shows a perspective view of the spring controlled mechanism of the spring latch 100 used to attach the cradle 70 to the housing 76, and FIG. 22B shows a perspective view of how a user moves the spring controlled mechanism of the spring latch 100. The spring 104 is compressed by pressing the spring close tabs 106 inward with a thumb and forefinger.

Figure 23:
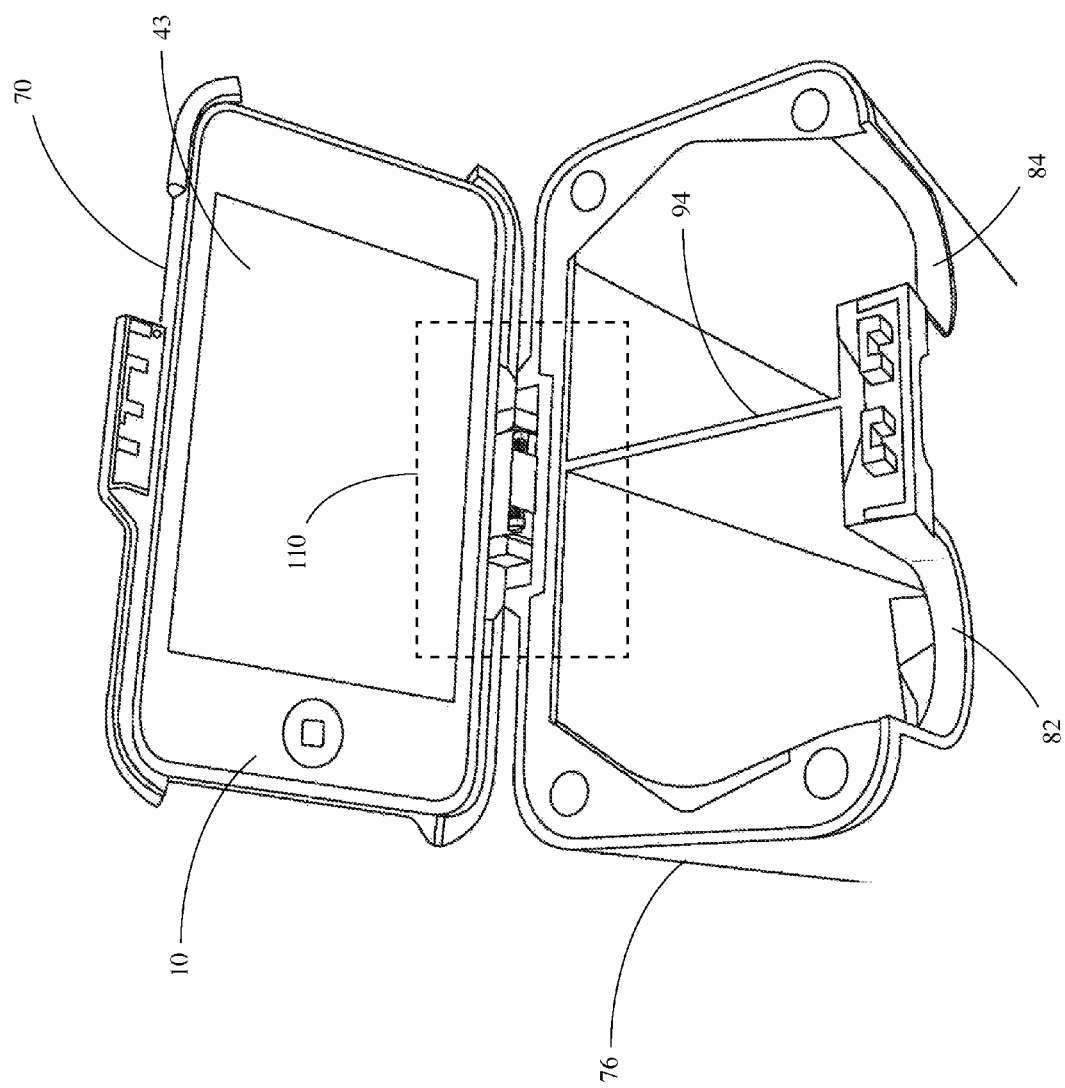
FIG. 23 shows a perspective view of the cradle coupled to the housing and a mobile graphical device fastened to the cradle.

FIG. 23 shows a perspective view of the cradle 70 coupled to the housing 76 and a mobile graphical device 10 fastened to the cradle 70. A coupled assembly 110 is shown so that the cradle 70 is pivotably secured to the housing 76. The display 43 on the mobile graphical device 10 is positioned so that when the cradle 70 is pivoted closed, the display 43 will face the eye lenses and be separated by the view divider 94. The first thumb hole 82 and the second thumb hole 84 are shown to be within reach of the display 43 touch screen when the apparatus is closed.

Use of the embodiments described above may be extended so that several devices may be coupled through a network. In this scenario, users may share their fields of view and three-dimensional views of their respective surroundings. The described embodiments may also be adapted for mobile graphical devices that do not have a camera by replacing the reflectors with a dual camera accessory that is configured to capture a direct field of view and an offset field of view as described above. This type of arrangement may also be configurable with the viewing apparatus described above.

One problem that may exist in the described embodiments is that light concentrated through the eye lenses into the viewing apparatus may damage the display of the mobile graphical device. This problem may be remedied by using a solar control film such as llumar R50 on the display, which will prevent degradation of an LCD or other type of display.

While the present inventions have been illustrated by a description of various embodiments and while these embodiments have been set forth in considerable detail, it is intended that the scope of the inventions be defined by the appended claims. It will be appreciated by those skilled in the art that modifications to the foregoing preferred embodiments may be made in various aspects. It is deemed that the spirit and scope of the inventions encompass such variations to be preferred embodiments as would be apparent to one of ordinary skill in the art and familiar with the teachings of the present application.

What is claimed is:

1. An apparatus for interfacing with stereoscopic images on a mobile graphical device comprising:
a first memory for storing data defining a first image;
a second memory for storing data defining a second image that is an offset view relative to the first image;
a display on the mobile graphical device with a two-paned image wherein a first pane shows an image defined by the data in the first memory and a second pane adjacent to the first pane shows an image defined by the data in the second memory;
a first eye lens and a second eye lens, the first eye lens being positioned for viewing only the first pane and the second eye lens being positioned for viewing only the second pane;
a touch screen on the display further comprising a first control icon area bordering the first pane and a second control icon area bordering corresponding sides of the second pane so that when viewed by an end user through the first eye lens and the second eye lens the first pane and the second pane appear as a single three-dimensional image and the first control icon area and the second control icon area appear as a single set of three-dimensional icons and a user control area adjacent to the three-dimensional icons and outside the area viewable through the first eye lens and the second eye lens that provide user control functions when touched by an end user;
wherein the mobile graphical device further comprises a camera lens having a field of view wherein the field of view is limited to a first portion of the field of view and a second portion of the field of view, the apparatus further comprising:
a first reflector juxtaposed relative to the camera lens wherein the first reflector is outside of the first portion of the field of view, with the second portion of the field of view comprising the first reflector at an angle to the plane crossing the circumference of the camera lens;
a second reflector juxtaposed relative to the first reflector wherein everything within the boundaries of the first portion of the field of view is reflected off the second reflector then reflected off the first reflector and into the second portion of the field of view;
a sensor that receives light reflected into the first portion of the field of view and light reflected into the second portion of the field of view and that outputs data defining the received reflections;
said first memory for storing data defining the reflection received through the first portion of the field of view; and
said second memory for storing data defining the reflection received through the second portion of the field of view, said display with said two-paned image respectively showing the first pane with the image defined by the reflection received through the first portion of the field of view of said first memory, and the second pane adjacent to the first pane showing the image defined by the reflection received through the second portion of the field of view of said second memory for producing split, offset images for immediate stereoscopic viewing with the mobile graphical device.

2. The apparatus recited in claim 1 wherein said first pane shows an image defined by the data in the first memory as a direct view of the first portion of the field of view and wherein said second pane adjacent to the first pane shows an image defined by the data in the second memory as an offset view of the first portion of the field of view as reflected through the second portion of the field of view.

3. The apparatus recited in claim 1 further comprising a cradle configured to receive the mobile graphical device, the sensor, the first memory and the second memory wherein the cradle is coupled to the first reflector, the second reflector, the first eye lens and the second eye lens.

4. The apparatus recited in claim 3 further comprising a housing coupled to the cradle, the first reflector, the second reflector, the first eye lens and the second eye lens.

5. The apparatus recited in claim 1 wherein the camera lens, the first reflector, the second reflector, the first eye lens and the second eye lens are positioned so that the first portion of the field of view and the second portion of the field of view simulate the view of a two-eyed human observer.

6. A method for producing images for stereoscopic viewing comprising:
   providing a mobile graphical device with a camera lens having a field of view;
   limiting the field of view to a first portion of the field of view and a second portion of the field of view;
   juxtaposing a first reflector relative to the camera lens wherein the first reflector is outside of the first portion of the field of view and wherein the second portion of the field of view comprises the first reflector with the first reflector at an angle to the plane crossing the circumference of the camera lens;
   juxtaposing a second reflector relative to the first reflector wherein everything within the boundaries of the first portion of the field of view is reflected off the second reflector then reflected off the first reflector and into the second portion of the field of view;
   placing a sensor to receive light reflected into the first portion of the field of view and light reflected into the second portion of the field of view;
   outputting data from the sensor defining the received reflections;
   providing a first memory for storing data defining the reflection received through the first portion of the field of view; and
   providing a second memory for storing data defining the reflection received through the second portion of the field of view, said sensor respectively receiving light reflected from the first portion of the field of view stored with said first memory, and receiving light reflected from the second portion of the field of view stored with said second memory for producing split, offset images for immediate stereoscopic viewing with the mobile graphical device.

7. The method for producing images for stereoscopic viewing recited in claim 6 further comprising:
   providing a display on the mobile graphical device;
   dividing the display into a two-paned image wherein a first pane shows an image defined by the data in the first memory as a direct view of the first portion of the field of view and a second pane adjacent to the first pane shows an image defined by the data in the second memory as an offset view of the first portion of the field of view as reflected through the second portion of the field of view;
   positioning a first eye lens and a second eye lens so that the first eye lens is positioned for viewing only the first pane and the second eye lens is positioned for viewing only the second pane;
   configuring a cradle to receive the mobile graphical device, the sensor, the first memory and the second memory;
   coupling the cradle to the first reflector, the second reflector, the first eye lens and the second eye lens; and
   coupling a housing to the cradle, the first reflector, the second reflector, the first eye lens and the second eye lens.

8. The method for producing images for stereoscopic viewing recited in claim 7 further comprising:
   providing a touch screen on the display;
   defining a first control icon area on the touch screen bordering the first pane;
   defining a second control icon area on the touch screen bordering corresponding sides of the second pane;
   wherein an end user who looks through the first eye lens and the second eye lens will see the first pane and the second pane as a single three-dimensional image and the first control icon area and the second control icon area as a single set of three-dimensional icons; and
   defining a user control area on the touch screen and outside the area viewable through the first eye lens and the second eye lens and providing user control functions inside the user control area.

9. A method for producing images for stereoscopic viewing comprising:
   providing a mobile graphical device with a camera lens having a field of view;
   limiting the field of view to a first portion of the field of view and a second portion of the field of view;
   juxtaposing a first reflector relative to the camera lens wherein the first reflector is outside of the first portion of the field of view and wherein the second portion of the field of view comprises the first reflector with the first reflector at an angle to the plane crossing the circumference of the camera lens;
   juxtaposing a second reflector relative to the first reflector wherein everything within the boundaries of the first portion of the field of view is reflected off the second reflector then reflected off the first reflector and into the second portion of the field of view;
   placing a sensor to receive light reflected into the first portion of the field of view and light reflected into the second portion of the field of view, said sensor respectively receiving light reflected from the first portion of the field of view of said first reflector, and receiving light reflected from the second portion of the field of view of said second reflector for producing split, offset images for immediate stereoscopic viewing with the mobile graphical device;
   outputting data from the sensor defining the received reflections;
   providing a first memory for storing data defining the reflection received through the first portion of the field of view; and
   providing a second memory for storing data defining the reflection received through the second portion of the field of view;
   providing a display on the mobile graphical device;
   dividing the display into a two-paned image wherein a first pane shows an image defined by the data in the first memory as a direct view of the first portion of the field of view and a second pane adjacent to the first pane shows an image defined by the data in the second memory as an offset view of the first portion of the field of view as reflected through the second portion of the field of view;
   positioning a first eye lens and a second eye lens so that the first eye lens is positioned for viewing only the first pane and the second eye lens is positioned for viewing only the second pane;
   configuring a cradle to receive the mobile graphical device, the sensor, the first memory and the second memory;
   coupling the cradle to the first reflector, the second reflector, the first eye lens and the second eye lens; and
   coupling a housing to the cradle, the first reflector, the second reflector, the first eye lens and the second eye lens.

10. The method for producing images for stereoscopic viewing recited in claim 9 comprising providing a solar control film to prevent degradation to the display of the mobile graphical device.

11. The method for producing images for stereoscopic viewing recited in claim 9 comprising providing llumar R50 solar control film on the display to prevent degradation to the display of the mobile graphical device.

12. The method for producing images for stereoscopic viewing recited in claim 9 further comprising:
- providing a touch screen on the display;
- defining a first control icon area on the touch screen bordering the first pane;
- defining a second control icon area on the touch screen bordering corresponding sides of the second pane;
- wherein an end user who looks through the first eye lens and the second eye lens will see the first pane and the second pane as a single three-dimensional image and the first control icon area and the second control icon area as a single set of three-dimensional icons; and
- defining a user control area on the touch screen and outside the area viewable through the first eye lens and the second eye lens and providing user control functions inside the user control area.

13. An apparatus for interfacing with stereoscopic images on a mobile graphical device comprising:
- a first memory for storing data defining a first image;
- a second memory for storing data defining a second image that is an offset view relative to the first image;
- a display on the mobile graphical device with a two-paned image wherein a first pane shows an image defined by the data in the first memory and a second pane adjacent to the first pane shows an image defined by the data in the second memory;
- a first eye lens and a second eye lens, the first eye lens being positioned for viewing only the first pane and the second eye lens being positioned for viewing only the second pane;
- a camera lens having a field of view wherein the field of view is limited to a first portion of the field of view and a second portion of the field of view, comprising a first reflector juxtaposed relative to the camera lens wherein the first reflector is outside of the first portion of the field of view, with the second portion of the field of view comprising the first reflector at an angle to the plane crossing the circumference of the camera lens, and a second reflector juxtaposed relative to the first reflector wherein everything within the boundaries of the first portion of the field of view is reflected off the second reflector then reflected off the first reflector and into the second portion of the field of view;
- a sensor that receives light reflected into the first portion of the field of view and light reflected into the second portion of the field of view and that outputs data defining the received reflections;
- a cradle configured to receive the mobile graphical device, the sensor, the first memory and the second memory wherein the cradle is coupled to the first reflector, the second reflector, the first eye lens and the second eye lens;
- said first memory for storing data defining the reflection received through the first portion of the field of view; and
- said second memory for storing data defining the reflection received through the second portion of the field of view, said display with said two-paned image respectively showing the first pane with the image defined by the reflection received through the first portion of the field of view of said first memory, and the second pane adjacent to the first pane showing the image defined by the reflection received through the second portion of the field of view of said second memory for producing split, offset images for immediate stereoscopic viewing with the mobile graphical device.

14. The apparatus recited in claim 13 comprising a solar control film on the display to prevent degradation to the display of the mobile graphical device.

15. The apparatus recited in claim 13 comprising llumar R50 solar control film on the display to prevent degradation to the display of the mobile graphical device.

16. The apparatus recited in claim 13 wherein said first pane shows an image defined by the data in the first memory as a direct view of the first portion of the field of view and wherein said second pane adjacent to the first pane shows an image defined by the data in the second memory as an offset view of the first portion of the field of view as reflected through the second portion of the field of view.

17. The apparatus recited in claim 13 further comprising a housing coupled to the cradle, the first reflector, the second reflector, the first eye lens and the second eye lens.

18. The apparatus recited in claim 13 wherein the camera lens, the first reflector, the second reflector, the first eye lens and the second eye lens are positioned so that the first portion of the field of view and the second portion of the field of view simulate the view of a two-eyed human observer.

\* \* \* \* \*